(12) United States Patent
Waas et al.

(10) Patent No.: US 11,475,001 B1
(45) Date of Patent: Oct. 18, 2022

(54) QUANTIFYING COMPLEXITY OF A DATABASE QUERY

(71) Applicant: Datometry, Inc., San Francisco, CA (US)

(72) Inventors: Florian Michael Waas, San Francisco, CA (US); Dmitri Korablev, San Francisco, CA (US); Michele Gage, San Francisco, CA (US); Mark Morcos, Oakland, CA (US); Amirhossein Aleyasen, Urbana, IL (US)

(73) Assignee: DATOMETRY, INC., San Francisco, CA (US)

( * ) Notice: Subject to any disclaimer, the term of this patent is extended or adjusted under 35 U.S.C. 154(b) by 320 days.

(21) Appl. No.: 16/599,049

(22) Filed: Oct. 10, 2019

Related U.S. Application Data

(60) Provisional application No. 62/890,572, filed on Aug. 22, 2019, provisional application No. 62/859,695, (Continued)

(51) Int. Cl.
  *G06F 16/242* (2019.01)
  *G06F 16/2453* (2019.01)
  (Continued)

(52) U.S. Cl.
  CPC ........ *G06F 16/2445* (2019.01); *G06F 16/214* (2019.01); *G06F 16/221* (2019.01);
  (Continued)

(58) Field of Classification Search
  CPC .. G06F 16/2445; G06F 16/214; G06F 16/221; G06F 16/243; G06F 16/2443; G06F 16/24534
  See application file for complete search history.

(56) References Cited

U.S. PATENT DOCUMENTS

| | | |
|---|---|---|
| 5,970,490 A | 10/1999 | Morgenstern |
| 6,108,649 A | 8/2000 | Young et al. |

(Continued)

FOREIGN PATENT DOCUMENTS

| | | |
|---|---|---|
| CN | 107122361 A | 9/2017 |
| WO | 2007121571 A1 | 11/2007 |

OTHER PUBLICATIONS

Aleyasen, A., et al., "High-Throughput Adaptive Data Virtualization via Context-Aware Query Routing," 2018 IEEE International Conference on Big Data, Dec. 10-13, 2018, 10 pages, Seattle, WA, USA.

(Continued)

*Primary Examiner* — Pierre M Vital
*Assistant Examiner* — Zuheir A Mheir
(74) *Attorney, Agent, or Firm* — Adeli LLP

(57) ABSTRACT

Some embodiments provide a method for quantifying complexity of database queries that reference database objects in a database. The method identifies a database query that includes a reference to a set of one or more database objects in the database. The method identifies a set of properties associated with a set of components of the identified query, and computes, from the identified set of properties, a complexity indicator that represents a complexity expression of the database query.

17 Claims, 20 Drawing Sheets

Related U.S. Application Data filed on Jun. 10, 2019, provisional application No. 62/859,693, filed on Jun. 10, 2019, provisional application No. 62/824,994, filed on Mar. 27, 2019, provisional application No. 62/817,533, filed on Mar. 12, 2019, provisional application No. 62/782,337, filed on Dec. 19, 2018.

(51) Int. Cl.
*G06F 16/21* (2019.01)
*G06F 16/22* (2019.01)

(52) U.S. Cl.
CPC ........ *G06F 16/243* (2019.01); *G06F 16/2443* (2019.01); *G06F 16/24534* (2019.01)

(56) References Cited

U.S. PATENT DOCUMENTS

| | | |
|---|---|---|
| 6,704,747 B1 | 3/2004 | Fong |
| 6,889,227 B1 | 5/2005 | Hamilton |
| 7,123,608 B1 | 10/2006 | Scott et al. |
| 7,146,376 B2 | 12/2006 | Dettinger et al. |
| 7,203,678 B1 | 4/2007 | Petropoulos et al. |
| 7,263,590 B1 | 8/2007 | Todd et al. |
| 7,346,635 B2 | 3/2008 | Whitten et al. |
| 7,359,916 B2 | 4/2008 | Werner |
| 7,480,661 B2 | 1/2009 | Seefeldt et al. |
| 7,620,665 B1 | 11/2009 | George et al. |
| 7,664,795 B2 | 2/2010 | Balin et al. |
| 7,693,913 B2 | 4/2010 | Goto |
| 7,805,583 B1 | 9/2010 | Todd et al. |
| 7,877,397 B2 | 1/2011 | Nagarajan et al. |
| 7,885,968 B1 | 2/2011 | Hamamatsu et al. |
| 7,904,487 B2 | 3/2011 | Ghatare |
| 8,015,233 B2 | 9/2011 | Li et al. |
| 8,250,027 B2 | 8/2012 | Fujiyama et al. |
| 8,275,810 B2 | 9/2012 | Barton |
| 8,429,601 B2 | 4/2013 | Andersen |
| 8,447,774 B1 | 5/2013 | Robie et al. |
| 8,533,177 B2 | 9/2013 | Huck et al. |
| 8,612,468 B2 | 12/2013 | Schloming |
| 8,631,034 B1 | 1/2014 | Peloski |
| 8,793,797 B2 | 7/2014 | Meenakshisundaram |
| 8,874,609 B1 | 10/2014 | Singh et al. |
| 8,898,126 B1 | 11/2014 | Dai |
| 8,918,416 B1 | 12/2014 | Gross et al. |
| 8,943,181 B2 | 1/2015 | Kasten et al. |
| 8,972,433 B2 | 3/2015 | McLean et al. |
| 8,996,555 B2 | 3/2015 | Kuchmann-Beauger et al. |
| 9,075,811 B2 | 7/2015 | Nayyar et al. |
| 9,158,827 B1 | 10/2015 | Vu et al. |
| 9,201,606 B1 | 12/2015 | Taylor et al. |
| 9,208,032 B1 | 12/2015 | McAlister et al. |
| 9,305,070 B2 | 4/2016 | Zhu et al. |
| 9,582,539 B1 * | 2/2017 | Cole ................ G06F 16/24535 |
| 9,639,572 B2 * | 5/2017 | Hutzel ................ G06F 16/288 |
| 9,665,619 B1 * | 5/2017 | Cole ................ G06F 16/2453 |
| 9,697,484 B1 | 7/2017 | Mohen et al. |
| 9,785,645 B1 | 10/2017 | Chen et al. |
| 9,811,527 B1 | 11/2017 | Esposito et al. |
| 10,108,914 B2 | 10/2018 | Mohen et al. |
| 10,120,920 B2 | 11/2018 | Alva et al. |
| 10,162,729 B1 | 12/2018 | Snyder et al. |
| 10,241,960 B2 | 3/2019 | Kent, IV et al. |
| 10,255,336 B2 | 4/2019 | Waas et al. |
| 10,261,956 B2 | 4/2019 | Jugel et al. |
| 10,445,334 B1 | 10/2019 | Xiao et al. |
| 10,585,887 B2 | 3/2020 | Tran et al. |
| 10,594,779 B2 | 3/2020 | Waas et al. |
| 10,599,664 B2 * | 3/2020 | Agrawal ................ G06F 16/285 |
| 10,614,048 B2 | 4/2020 | Fuglsang et al. |
| 10,628,438 B2 | 4/2020 | Waas et al. |
| 10,649,965 B2 | 5/2020 | Barbas et al. |
| 10,649,989 B2 | 5/2020 | Lereya et al. |
| 10,762,100 B2 | 9/2020 | Waas et al. |
| 10,762,435 B2 | 9/2020 | Yang et al. |
| 10,769,200 B1 | 9/2020 | Lin |
| 10,783,124 B2 | 9/2020 | Barbas et al. |
| 10,846,284 B1 | 11/2020 | Park et al. |
| 11,016,954 B1 | 5/2021 | Babocichin et al. |
| 11,204,898 B1 | 12/2021 | Waas et al. |
| 2001/0034733 A1 | 10/2001 | Prompt et al. |
| 2002/0087587 A1 | 7/2002 | Vos et al. |
| 2002/0133504 A1 | 9/2002 | Vlahos et al. |
| 2002/0161907 A1 | 10/2002 | Moon |
| 2003/0126156 A1 | 7/2003 | Stoltenberg et al. |
| 2003/0184793 A1 | 10/2003 | Pineau |
| 2004/0122953 A1 | 6/2004 | Kalmuk et al. |
| 2004/0139061 A1 | 7/2004 | Colossi et al. |
| 2004/0215629 A1 | 10/2004 | Dettinger et al. |
| 2005/0038781 A1 | 2/2005 | Ferrari et al. |
| 2005/0080914 A1 | 4/2005 | Lerner et al. |
| 2005/0234889 A1 | 10/2005 | Fox et al. |
| 2006/0026179 A1 | 2/2006 | Brown et al. |
| 2006/0136448 A1 | 6/2006 | Cialini et al. |
| 2006/0167896 A1 | 7/2006 | Kapur et al. |
| 2006/0242297 A1 | 10/2006 | Aronoff et al. |
| 2007/0027905 A1 | 2/2007 | Warren et al. |
| 2007/0061266 A1 | 3/2007 | Moore et al. |
| 2007/0136311 A1 | 6/2007 | Kasten et al. |
| 2007/0219959 A1 | 9/2007 | Kanemasa |
| 2007/0239774 A1 | 10/2007 | Bodily et al. |
| 2007/0283144 A1 | 12/2007 | Kramer et al. |
| 2008/0281784 A1 | 11/2008 | Zane et al. |
| 2009/0024622 A1 | 1/2009 | Chkodrov et al. |
| 2009/0059785 A1 | 3/2009 | Jogalekar et al. |
| 2009/0132503 A1 | 5/2009 | Sun et al. |
| 2009/0150367 A1 | 6/2009 | Melnik et al. |
| 2009/0240711 A1 | 9/2009 | Levin |
| 2009/0319498 A1 | 12/2009 | Zabokritski et al. |
| 2010/0023481 A1 | 1/2010 | McGoveran |
| 2010/0082646 A1 | 4/2010 | Meek et al. |
| 2010/0094838 A1 | 4/2010 | Kozak |
| 2010/0169377 A1 | 7/2010 | Galeazzi et al. |
| 2010/0169381 A1 * | 7/2010 | Faunce ............ G06F 16/24534 707/797 |
| 2011/0010379 A1 | 1/2011 | Gilderman et al. |
| 2011/0055231 A1 | 3/2011 | Huck et al. |
| 2011/0154461 A1 | 6/2011 | Anderson et al. |
| 2011/0191343 A1 | 8/2011 | Heaton et al. |
| 2011/0276623 A1 | 11/2011 | Girbal |
| 2011/0320444 A1 | 12/2011 | Yehaskel et al. |
| 2012/0005148 A1 | 1/2012 | Horvitz et al. |
| 2012/0036146 A1 | 2/2012 | Annapragada |
| 2012/0102022 A1 | 4/2012 | Miranker et al. |
| 2012/0131567 A1 | 5/2012 | Barros et al. |
| 2012/0158650 A1 | 6/2012 | Andre et al. |
| 2012/0179677 A1 | 7/2012 | Roselli et al. |
| 2012/0221817 A1 | 8/2012 | Yueh |
| 2012/0296942 A1 | 11/2012 | Arora et al. |
| 2012/0303913 A1 | 11/2012 | Kathmann et al. |
| 2012/0304179 A1 | 11/2012 | Devarakonda et al. |
| 2013/0066948 A1 | 3/2013 | Colrain et al. |
| 2013/0085989 A1 | 4/2013 | Nayyar et al. |
| 2013/0163737 A1 | 6/2013 | Dement et al. |
| 2013/0179476 A1 | 7/2013 | Saam et al. |
| 2013/0262425 A1 | 10/2013 | Shamlin et al. |
| 2013/0311729 A1 | 11/2013 | Navarro et al. |
| 2013/0325927 A1 | 12/2013 | Corbett et al. |
| 2014/0095534 A1 | 4/2014 | Aingaran et al. |
| 2014/0136516 A1 | 5/2014 | Clifford et al. |
| 2014/0143011 A1 | 5/2014 | Mudugu et al. |
| 2014/0195514 A1 | 7/2014 | Stein |
| 2014/0244610 A1 | 8/2014 | Raman et al. |
| 2014/0280286 A1 | 9/2014 | Ganti et al. |
| 2014/0325096 A1 | 10/2014 | Jung et al. |
| 2014/0359129 A1 | 12/2014 | Sharma et al. |
| 2015/0019488 A1 | 1/2015 | Higginson et al. |
| 2015/0095381 A1 | 4/2015 | Chen et al. |
| 2015/0172206 A1 | 6/2015 | Anderson et al. |
| 2015/0248404 A1 | 9/2015 | Pazdziora et al. |
| 2015/0269223 A1 | 9/2015 | Miranker et al. |
| 2015/0310057 A1 | 10/2015 | Fu et al. |

(56) References Cited

U.S. PATENT DOCUMENTS

| | | | |
|---|---|---|---|
| 2015/0339361 A1 | 11/2015 | Kumar et al. | |
| 2015/0347585 A1 | 12/2015 | Klotz | |
| 2015/0363396 A1 | 12/2015 | Sengupta et al. | |
| 2016/0127325 A1 | 5/2016 | Odenheimer et al. | |
| 2016/0188710 A1 | 6/2016 | Naik | |
| 2016/0261576 A1 | 9/2016 | Nivala et al. | |
| 2016/0292164 A1 | 10/2016 | Kedia et al. | |
| 2016/0292167 A1 | 10/2016 | Tran et al. | |
| 2016/0308941 A1 | 10/2016 | Cooley | |
| 2016/0321097 A1 | 11/2016 | Zhu et al. | |
| 2016/0328442 A1 | 11/2016 | Waas et al. | |
| 2016/0335361 A1 | 11/2016 | Teodorescu et al. | |
| 2017/0011104 A1 | 1/2017 | Hyde et al. | |
| 2017/0017685 A1 | 1/2017 | Das et al. | |
| 2017/0034095 A1 | 2/2017 | Kamalakantha et al. | |
| 2017/0063936 A1 | 3/2017 | Waas et al. | |
| 2017/0116207 A1 | 4/2017 | Lee et al. | |
| 2017/0116249 A1 | 4/2017 | Ravipati et al. | |
| 2017/0116260 A1 | 4/2017 | Chattopadhyay | |
| 2017/0116274 A1 | 4/2017 | Weissman et al. | |
| 2017/0116298 A1 | 4/2017 | Ravipati et al. | |
| 2017/0124146 A1 | 5/2017 | Lereya et al. | |
| 2017/0147656 A1 | 5/2017 | Choudhary et al. | |
| 2017/0177650 A1 | 6/2017 | Devine et al. | |
| 2017/0235790 A1 | 8/2017 | Bruso et al. | |
| 2017/0249353 A1 | 8/2017 | Gulik et al. | |
| 2017/0262777 A1 | 9/2017 | Mohen et al. | |
| 2017/0364694 A1 | 12/2017 | Jacob et al. | |
| 2017/0373935 A1 | 12/2017 | Subramanian et al. | |
| 2018/0081946 A1 | 3/2018 | Bondalapati et al. | |
| 2018/0121433 A1 | 5/2018 | Nevrekar et al. | |
| 2018/0144001 A1 | 5/2018 | Lai et al. | |
| 2018/0150361 A1 | 5/2018 | Khandelwal | |
| 2018/0173775 A1 | 6/2018 | Li et al. | |
| 2018/0218030 A1 | 8/2018 | Wong et al. | |
| 2018/0234327 A1 | 8/2018 | Kono | |
| 2018/0246886 A1 | 8/2018 | Dragomirescu et al. | |
| 2018/0285475 A1 | 10/2018 | Grover et al. | |
| 2018/0292995 A1 | 10/2018 | Tal et al. | |
| 2018/0329916 A1 | 11/2018 | Waas et al. | |
| 2018/0336258 A1 | 11/2018 | Lee et al. | |
| 2018/0357291 A1 | 12/2018 | Choi et al. | |
| 2019/0065536 A1 | 2/2019 | Becker et al. | |
| 2019/0095241 A1 | 3/2019 | Ago et al. | |
| 2019/0138402 A1 | 5/2019 | Bikumala et al. | |
| 2019/0155805 A1 | 5/2019 | Kent, IV et al. | |
| 2019/0294763 A1 | 9/2019 | Coatrieux et al. | |
| 2019/0303379 A1 | 10/2019 | Waas et al. | |
| 2019/0311057 A1 | 10/2019 | Sung et al. | |
| 2019/0327154 A1 | 10/2019 | Sahoo et al. | |
| 2019/0392067 A1 | 12/2019 | Sonawane et al. | |
| 2020/0104375 A1 | 4/2020 | Earnesty, Jr. et al. | |
| 2020/0104376 A1 | 4/2020 | Earnesty, Jr. et al. | |
| 2020/0104377 A1 | 4/2020 | Earnesty, Jr. et al. | |
| 2020/0125582 A1 | 4/2020 | O'Shaughnessy | |
| 2020/0167323 A1 | 5/2020 | Swamy et al. | |
| 2020/0169600 A1 | 5/2020 | Waas et al. | |
| 2020/0183929 A1 | 6/2020 | Lee et al. | |
| 2020/0201860 A1 | 6/2020 | Vogelsgesang et al. | |
| 2020/0250179 A1* | 8/2020 | Agrawal | G06F 16/211 |
| 2020/0278966 A1* | 9/2020 | Al-Omari | G06F 16/24542 |
| 2021/0034636 A1 | 2/2021 | Waas et al. | |

OTHER PUBLICATIONS

Antova, Lyublena, et al., "Datometry Hyper-Q: Bridging the Gap Between Real-Time and Historical Analytics," SIGMOD'16, Jun. 26-Jul. 1, 2016, 12 pages, ACM, San Francisco, CA, USA.

Antova, Lyublena, et al., "Rapid Adoption of Cloud Data Warehouse Technology Using Datometry Hyper-Q," Month Unknown, 2017, 12 pages, Datometry, Inc.

Author Unknown, "AWS Database Migration Service," Month Unknown, 2017, 8 pages, Amazon Web Services, Inc., retrieved from https://aws.amazon.com/dms/.

Author Unknown, "DBBest Technologies," Month Unknown, 2017, 3 pages, DB Best Technologies, LLC, retrieved from https://www.dbbest.com/.

Author Unknown, "Ispirer," Month Unknown, 2017, 5 pages, Ispirer Systems, LLC, retrieved from https://www.ispirercom/.

Author Unknown, "Linked Servers (Database Engine)," Oct. 14, 2019, 5 pages, Microsoft, retrieved from https://docs.microsoft.com/en-us/sql/relational-databases/linked-servers/linked-servers-database-engine?view=sql-server-ver15.

Author Unknown, "Replatforming Custom Business Intelligence," Case Study, Month Unknown 2018, 2 pages, Datometry, Inc.

Author Unknown, "Teradata Data Warehouse—End of Useful Life," Case Study, Month Unknown 2018, 2 pages, Datometry, Inc., retrieved from https://datometry.com/resources/case-studies/replatform-teradata-end-of-useful-life-replatforming-to-cloud/.

Gupta, Anurag, et al., "Amazon Redshift and the Case for Simpler Data Warehouses," SIGMOD'15, May 31, 2015-Jun. 4, 2015, 7 pages, ACM, Melbourne, Victoria, Australia.

Non-Published Commonly Owned U.S. Appl. No. 16/599,055, filed Oct. 10, 2019, 53 pages, Datometry, Inc.

Non-Published Commonly Owned U.S. Appl. No. 16/599,057, filed Oct. 10, 2019, 54 pages, Datometry, Inc.

Non-Published Commonly Owned U.S. Appl. No. 16/599,061, filed Oct. 10, 2019, 53 pages, Datometry, Inc.

Non-Published Commonly Owned U.S. Appl. No. 16/599,064, filed Oct. 10, 2019, 53 pages, Datometry, Inc.

Non-Published Commonly Owned U.S. Appl. No. 16/599,066, filed Oct. 10, 2019, 53 pages, Datometry, Inc.

Non-Published Commonly Owned U.S. Appl. No. 16/599,071, filed Oct. 10, 2019, 53 pages, Datometry, Inc.

Simitsis, Alkis, et al., "Optimizing Analytic Data Flows for Multiple Execution Engines," SIGMOD '12, May 20-24, 2012, 12 pages, ACM, Scottsdale, Arizona, USA.

Soliman, Mohamed A., et al., "Orca: A Modular Query Optimizer Architecture for Big Data," SIGMOD'14, Jun. 22-27, 2014, 12 pages, ACM, Snowbird, Utah, USA.

Antova, Lyublena, et al., "An Integrated Architecture for Real-Time and Historical Analytics in Financial Services," Real-Time Business Intelligence and Analytics—International Workshops (BIRTE 2015), Aug. 31, 2015, 8 pages, Kohala Coast, HI, USA.

Author Unknown, "46.2. Message Flow," PostgreSQL 9.2.24 Documentation, Chapter 46: Frontend/Backend Protocol, Nov. 9, 2017, 8 pages, The PostgreSQL Global Development Group, retrieved from https://www.postgresql.org/docs/9.2/static/protocol-flow.html.

Author Unknown, "46.5. Message Formats," PostgreSQL 9.2.24 Documentation, Chapter 46: Frontend/Backend Protocol, Nov. 9, 2017, 11 pages, The PostgreSQL Global Development Group, retrieved from https://www.postgresql.org/docs/9.2/static/protocol-message-formats.html.

Author Unknown, "Greenplum Database: Critical Mass Innovation," Architecture White Paper, Aug. 2010, 17 pages, EMC Corporation, San Mateo, CA, USA.

Author Unknown, "Informatica Data Services," Data Sheet, Month Unknown, 2015, 4 pages, Informatica LLC, Redwood City, CA, USA.

Author Unknown, "Informatica PowerCenter Data Virtualization Edition," Data Sheet, Month Unknown, 2013, 8 pages, Informatica LLC, Redwood City, CA, USA.

Author Unknown, "Introduction to InfoSphere Federation Server," IBM InfoSphere Foundation Tools IBM InfoSphere Information Server, Version 8.7.0, Oct. 1, 2011, 4 pages, IBM.

Author Unknown, "MemSQL Overview," White Paper, Aug. 2018, 4 pages, MemSQL Inc.

Author Unknown, "Microsoft Analytics Platform System," Jan. 2016, 2 pages, Microsoft Corporation.

Author Unknown, "Reference/ipcprotocol," Feb. 13, 2017, 8 pages, retrieved from http://code.kx.com/wiki/Reference/ipcprotocol.

Author Unknown, "Teradata Vantage," Data Sheet, Month Unknown 2018, 3 pages, Teradata Corporation, San Diego, CA, USA.

Author Unknown, "The 21st Century Time-series Database," White Paper, Jul. 2016, 10 pages, Kx Systems, Inc.

Author Unknown, "The Denodo Platform 7.0," White Paper, Month Unknown, 2018, 44 pages, Denodo Technologies.

(56) References Cited

OTHER PUBLICATIONS

Bear, Chuck, et al., "The Vertica Database: SQL RDBMS for Managing Big Data," MBDS'12, Sep. 21, 2012, 2 pages, ACM, San Jose, CA, USA.
Bornea, Mihaela A., et al., "One-Copy Serializability with Snapshot Isolation Under the Hood," 2011 IEEE 27th International Conference on Data Engineering, Apr. 11-16, 2011, 12 pages, IEEE, Hannover, Germany.
Cecchet, Emmanuel, et al., "Middleware-based Database Replication: The Gaps Between Theory and Practice," SIGMOD'08, Jun. 9-12, 2008, 14 pages, Vancouver, Canada.
Chang, Lei, et al., "HAWQ: A Massively Parallel Processing SQL Engine in Hadoop," SIGMOD'14, Jun. 22-27, 2014, 12 pages, ACM, Snowbird, Utah, USA.
Elnikety, Sameh, et al., "Tashkent: Uniting Durability with Transaction Ordering for High-Performance Scalable Database Replication," EuroSys'06, Apr. 18-21, 2006, 14 pages, ACM, Leuven, Belgium.
Flores, Carlos, et al., "SeDiM: A Middleware Framework for Interoperable Service Discovery in Heterogeneous Networks," ACM Transactions on Autonomous and Adaptive Systems, Feb. 2011, 8 pages, vol. 6, No. 1, Article 6, ACM, New York, NY, USA.
Garland, Simon, "Big Data Analytics: Tackling the Historical Data Challenge," CIOReview, Month Unknown 2014, 3 pages, retrieved from https://data-analytics.cioreview.com/cxoinsight/big-data-analytics-tackling-the-historical-data-challenge-nid-4298-cid-156.html.
Gog, Ionel, et al. "Musketeer: all for one, one for all in data processing systems," EuroSys'15, Apr. 21-24, 2015, 16 pages, ACM, Bordeaux, France.
Gorman, Ciarán, "Columnar Database and Query Optimization," Technical Whitepaper, Mar. 2013, 26 pages, Kx Systems, Inc.
Gray, Jim, et al., "The Dangers of Replication and a Solution," Technical Report—MSR-TR-96-17, SIGMOD '96, Jun. 4-6, 1996, 12 pages, ACM, Montreal, Quebec, Canada.
Hanna, James, "Multi-Partitioned kdb+ Databases: An Equity Options Case Study," Technical Whitepaper, Oct. 2012, 13 pages, Kx Systems, Inc.
Heimbigner, Dennis, et al., "A Federated Architecture for Information Management," ACM Transactions on Information Systems (TOIS), Jul. 1985, 26 pages, vol. 3, Issue 3, New York, NY, USA.
Hohenstein, Uwe, et al., "Improving Connection Pooling Persistence Systems," 2009 First International Conference on Intensive Applications and Services, Apr. 20-25, 2009, 7 pages, IEEE, Valencia, Spain.
Hwang, San-Yih, "The MYRIAD Federated Database Prototype," SIGMOD '94 Proceedings of the 1994 ACM SIGMOD International Conference on Management of Data, May 24-27, 1994, 1 page, ACM, New York, New York, USA.

Kache, Holger, et al., "POP/FED: Progressive Query Optimization for Federated Queries in DB2," VLDB '06, Sep. 12-15, 2006, 4 pages, ACM, Seoul, Korea.
Lin, Yi, et al., "Middleware based Data Replication Providing Snapshot Isolation," SIGMOD 2005, Jun. 14-16, 2005, 12 pages, ACM, Baltimore, Maryland, USA.
Non-Published Commonly Owned U.S. Appl. No. 16/270,575, filed Feb. 7, 2019, 36 pages, Datometry, Inc.
Non-Published Commonly Owned U.S. Appl. No. 16/542,133, filed Aug. 15, 2019, 70 pages, Datometry, Inc.
Non-Published Commonly Owned U.S. Appl. No. 16/542,140, filed Aug. 15, 2019, 70 pages, Datometry, Inc.
Non-Published Commonly Owned U.S. Appl. No. 16/542,143, filed Aug. 15, 2019, 71 pages, Datometry, Inc.
Non-Published Commonly Owned U.S. Appl. No. 16/542,145, filed Aug. 15, 2019, 71 pages, Datometry, Inc.
Non-Published Commonly Owned U.S. Appl. No. 16/542,146, filed Aug. 15, 2019, 71 pages, Datometry, Inc.
Non-Published Commonly Owned U.S. Appl. No. 16/542,148, filed Aug. 15, 2019, 71 pages, Datometry, Inc.
Non-Published Commonly Owned U.S. Appl. No. 16/684,785, filed Nov. 15, 2019, 54 pages, Datometry, Inc.
Non-Published Commonly Owned U.S. Appl. No. 16/684,803, filed Nov. 15, 2019, 54 pages, Datometry, Inc.
Non-Published Commonly Owned U.S. Appl. No. 16/684,847, filed Nov. 15, 2019, 54 pages, Datometry, Inc.
Owrang O., M. Mehdi, et al., "A Parallel Database Machine for Query Translation in a Distributed Database System," SAC '86: Proceedings of the 1986 Workshop on Applied Computing, Oct. 1986, 6 pages.
Plattner, Christian, et al., "Ganymed: Scalable Replication for Transactional Web Applications," Middleware '04, Oct. 18-22, 2004, 20 pages, Toronto, Canada.
Pullokkaran, Laljo John, "Analysis of Data Virtualization & Enterprise Data Standardization in Business Intelligence," Working Paper CISL# 2013-10, May 2013, 60 pages, Massachusetts Institute of Technology, Cambridge, Massachusetts, USA.
Schlamb, Kelly, "dashDB: Self-service data warehousing in the cloud at any scale," DB2 Tech Talk, Jun. 25, 2015, 55 pages, IBM Corporation.
Wang, Jinfu, et al., "Anomaly Detection in the Case of Message Oriented Middleware," MidSec '08, Dec. 1-5, 2008, 3 pages, ACM, Leuven, Belgium.
Whitney, Arthur, et al., "Lots o' Ticks: real-time high performance time series queries on billions of trades and quotes," ACM SIGMOD 2001, May 21-24, 2001, 1 page, ACM, Santa Barbara, California, USA.
Zhang, Mingyi, et al., "Workload Management in Database Management Systems: A Taxonomy," IEEE Transactions on Knowledge and Data Engineering—Manuscript, Month Unknown 2017, 18 pages, IEEE.

* cited by examiner

Prepare your Workload Script and Run Command

To prepare for the analysis process, complete the fields below, download the script and follow the instructions to execute the script. Note that sometimes the native log and SQL tables are renamed in the data warehouse.

Enter the following details to generate the workload preparation script.

| | |
|---|---|
| Server Name | 11.2.11.4 — 405 |
| Log table name | pdcrinfo.dbqlogtbl_hst — 410 |
| SQL table name | pdcrinfo.dbqlsqltbl_hst |
| Date (from) | 01/01/2019 — 415 |
| Date (to) | 01/08/2019 |

[Download workload script] — 420

*Figure 4A*

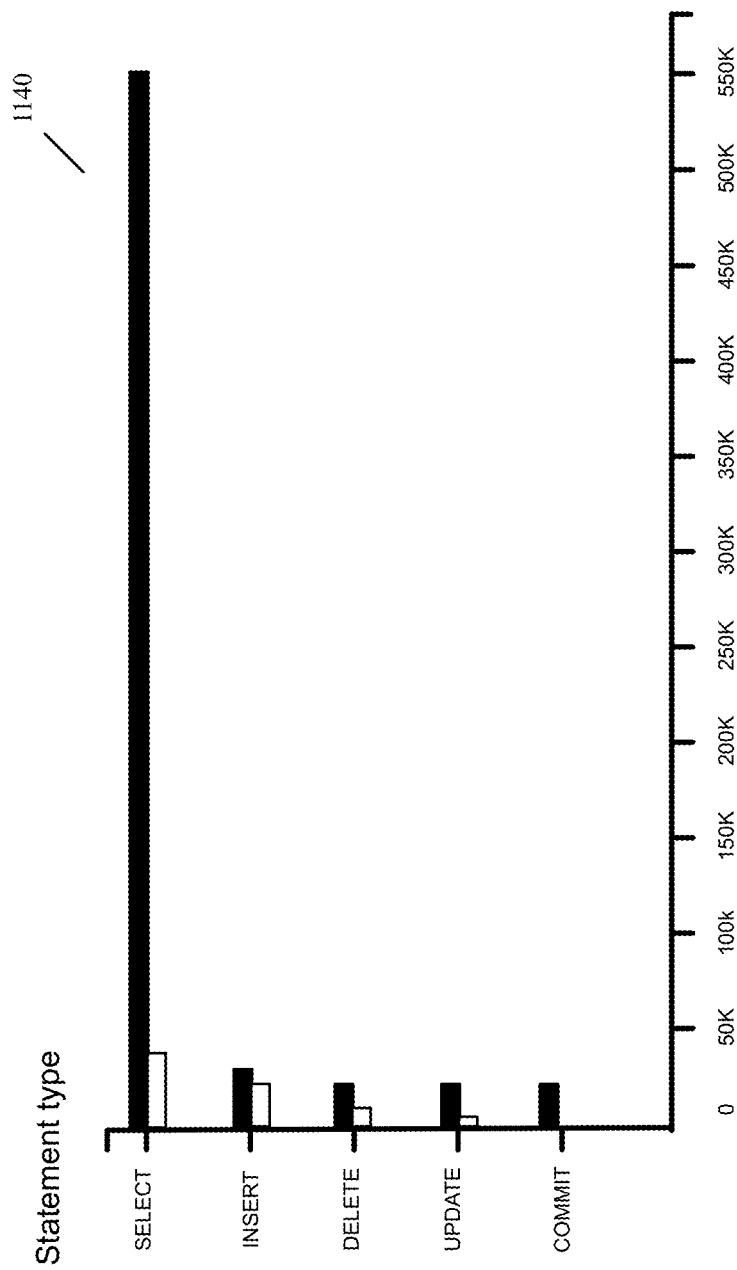

Most complex features
1175

| Statement Features | Total Statements | Unique Features |
|---|---|---|
| SAMPLES | 1,257 (<1%) | 348 (<1%) |
| RECURSIVE | 879 (<1%) | 532 (<1%) |
| UPPERCASE COLS | 385 (<1%) | 370 (<1%) |
| DAYNUMBER OF WEEK FNS | 8 (<1%) | 8 (<1%) |
| MERGES | 0 (<1%) | 0 (<1%) |
| DAYNUMBER OF MONTH | 0 (<1%) | 0 (<1%) |
| MONTHNUMBER OF CALENDAR FNS | 0 (<1%) | 0 (<1%) |
| MONTHNUMBER OF QUARTER FNS | 0 (<1%) | 0 (<1%) |
| WEEKNUMBER OF CALENDAR FNS | 0 (<1%) | 0 (<1%) |
| WEEKNUMBER OF MONTH FNS | 0 (<1%) | 0 (<1%) |

*Figure 11G*

QUANTIFYING COMPLEXITY OF A DATABASE QUERY

BACKGROUND

The advantages of modern data-warehouse-as-a-service (DWaaS) systems have motivated many companies to migrate from on-premises warehouse systems (e.g., Teradata or Oracle) to cloud-native systems (e.g., Microsoft Azure SQL, Amazon RedShift and other database APIs). Adaptive data virtualization can reduce the costs of data warehouse migration by translating queries in real time from the on-premise system to the new vendor's SQL dialect. This shortens the time for migrating data warehouse applications from years to days or weeks. However, selecting an optimal target for database migration (or "re-platforming") requires granular insight into the legacy system workload, and how that workload is generated by different database client applications.

BRIEF SUMMARY

Some embodiments of the invention provide a novel method for identifying client applications that use a database, and characteristics of these applications' workload on the database. The method of some embodiments receives a log for the database that identifies several queries that were performed on the database during a duration of time. In some embodiments, the log is a log that is maintained by the database, while in other embodiments the log is a log that one or more programs (e.g., one or more scripts) extract from another log maintained by the database.

The method then analyzes the received log to identify a set of client applications that each generated one or more queries to the database during the duration of time. In some embodiments, the received log includes for each query an application identifier (or combination of other attributes) that uniquely identifies an application that generated the query. In these embodiments, the method identifies the set of client applications from the log by first identifying the queries in the received log, and then using the application identifiers or other attributes to identify the application that generated the queries.

From the identified queries, the method in some embodiments identifies sets of queries performed by different applications. Based on a set of properties for each set of queries for each application, the method in some embodiments generates a complexity indicator that represents a level of difficulty to understand the set of queries, e.g. by a person or machine. In some embodiments, the complexity indicator also represents a level of difficulty in rewriting the set of queries for another database, such as a candidate database for migrating the data from the original database. In some embodiments, the complexity indicator also represents a level of difficulty in verifying the results of the rewritten query after it has been executed on the candidate database after migration.

As further described below, the method in some embodiments generates the complexity indicator for each application's queries by analyzing the queries individually to identify the components of the queries and generating complexity scores for the queries based on complexity values associated with the components and patterns within the queries. The method then includes the complexity indicators in a report in order to identify the complexity of understanding and rewriting each application.

In analyzing the queries, the method in some embodiments removes duplicate queries by only maintaining one query in several queries that have the same semantic structure, e.g., the same set of query components. The method removes duplicate queries as it does not need to assess duplicate queries to compute the same complexity score multiple times for two or more queries that have the same semantic structure. To identify duplicate queries, the method in some embodiments generates for each query a query identifier based on a set of components of the query, and then identifies two queries as duplicates when they have the same generated query identifier. In some embodiments, constants and semantically insignificant parts of the query are removed before generating the query identifier. A query's generated identifier in some embodiments is a hash value that is generated from the identifiers of the query components.

While removing duplicate queries, the method in some embodiments generates metadata (e.g., count values) regarding the removed duplicate queries, and then uses the generated metadata to express the complexity indicators for the queries associated with a client application. For instance, in some embodiments, the method of some embodiments computes a complexity score for each semantically unique query in the set of queries and then aggregates the computed complexity scores for the queries in the set, in order to obtain an aggregate complexity score that is a complexity indicator for the entire set of queries, i.e., the logical complexity of the database workload. This aggregation uses the metadata generated during the duplication removal in computing the aggregate complexity score.

To generate the complexity score for a query that references a set of one or more database objects in the database, the method of some embodiments identifies a set of properties associated with a set of components of the query and then computes, from the extracted set of properties, a complexity score that represents a level of difficulty in understanding and rewriting the query. In some embodiments, the set of properties include a grouping of the components according to a set of component types and a number of each component type in the database query. The number for each component type is used in some embodiments to calculate the complexity score for the query.

In some embodiments, each component type has a cost value associated with it and the complexity score for a query is computed by using the cost values of its identified component types. In some embodiments, the complexity score is computed as a weighted sum. In some of these embodiments, each component type's cost value is a weight value. In other embodiments, each component type's cost value is a normalizing cost score that is added with the other cost scores of the query's other component types through weight values.

In some embodiments, the identified set of components for a query include reference to a set of one or more objects in the database and at least one command that specifies an operation with respect to the set of referenced database objects. The identified set of properties for the query components in some embodiments includes a command type for the command and a set of attributes associated with the referenced database objects, such as the number of referenced database objects, the object types for the referenced database objects, etc. In some embodiments, a component type specifies whether the referenced object is one of a persistent table, a temporary table, a view, a column, a macro, and a stored procedure. The command type in some embodiments also specifies whether the command is a SQL command and a non-SQL command.

In some embodiments, the identified set of properties specify an operation type for the operation specified by the command. Examples of operation types include an inner join operation, an outer join operation, an implicit join operation and a partition operation. Also, in some embodiments, the identified set of properties include a function type for a function used in the operation specified by the command. Examples of function type or operation include a data filtering function, a data format function, a data manipulation function, and a case sensitivity function.

To identify the set of components of a query, the method of some embodiments performs a parsing operation to parse the query into an abstract query syntax from which the components are identified. To do this, the method in some embodiments associates query components and properties identified from the abstract query syntax to another set of query components and properties defined for a database-independent form.

Some embodiments of the method also identify a set of overall workload attributes that quantify the impact of performing the queries on the database. In some embodiments, the workload attributes are identified based on an analysis of operational metadata that is generated by the database during execution of the queries. In some embodiments, the operational metadata is included in the received log. The method then includes the workload attributes in a report in order to further characterize the workload.

Some of the workload attributes are associated with the identified applications. For example, these attributes include a count of the queries performed by each application, a count of database objects referenced by queries performed by each application, and a throughput of queries performed over a unit interval of time by each application. In some embodiments the count of queries is a count of unique queries after removing duplicate queries.

Some of the workload attributes are global attributes that describe the workload of the database overall. For example, these attributes include a number of queries in each of a set of query types, a count of database constructs (e.g., database objects and schemas) referenced by the queries, a total size of the database, a throughput of the queries performed on the database over a unit interval of time, and a count of unused database objects that were not referenced by the queries. In such embodiments, the count of the database constructs is a count of the number of constructs of different types. In some of these embodiments, the throughput of queries includes a peak throughput and an average throughput, and the unit interval time is expressed in minutes, hours, and days.

To report the complexity indicators and workload attributes, some embodiments of the method provide a graphical user interface. In some embodiments, the user interface allows the user to select a period of time and specific database applications for filtering the workload to be analyzed. In some embodiments, the user also specifies a candidate database system to evaluate as a re-platforming target.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIGS. 4A-B conceptually illustrate the user interface at various stages of performing the process of FIG. 3.

FIGS. 11A-H illustrate examples of insights provided by the report in some embodiments.

DETAILED DESCRIPTION

Some embodiments of the invention provide a novel method for identifying client applications that use a database, and characteristics of these applications' workload on the database. In some embodiments, the method is performed by a database insight engine for informing decisions on re-platforming the original database to a different candidate database. The database insight engine of some embodiments receives a log for the database that identifies a number of queries that were performed on the database during a duration of time. These queries are expressed in some embodiments as Structured Query Language (SQL) queries, and each query includes multiple SQL statements. In other embodiments the queries are expressed using other APIs or commands.

Figure 1:
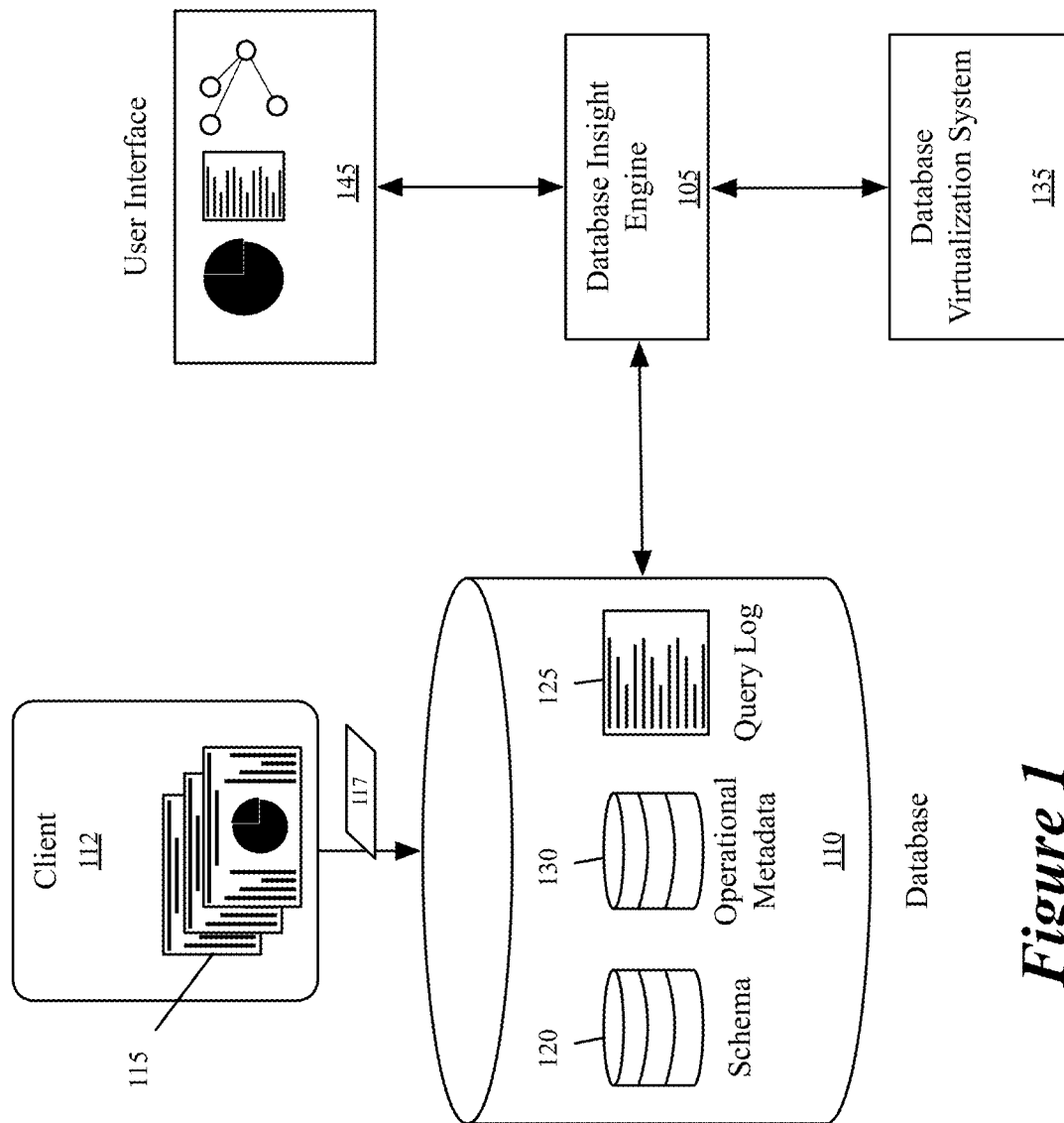
FIG. 1 conceptually illustrates a database insight engine of some embodiments.
Figure 2:
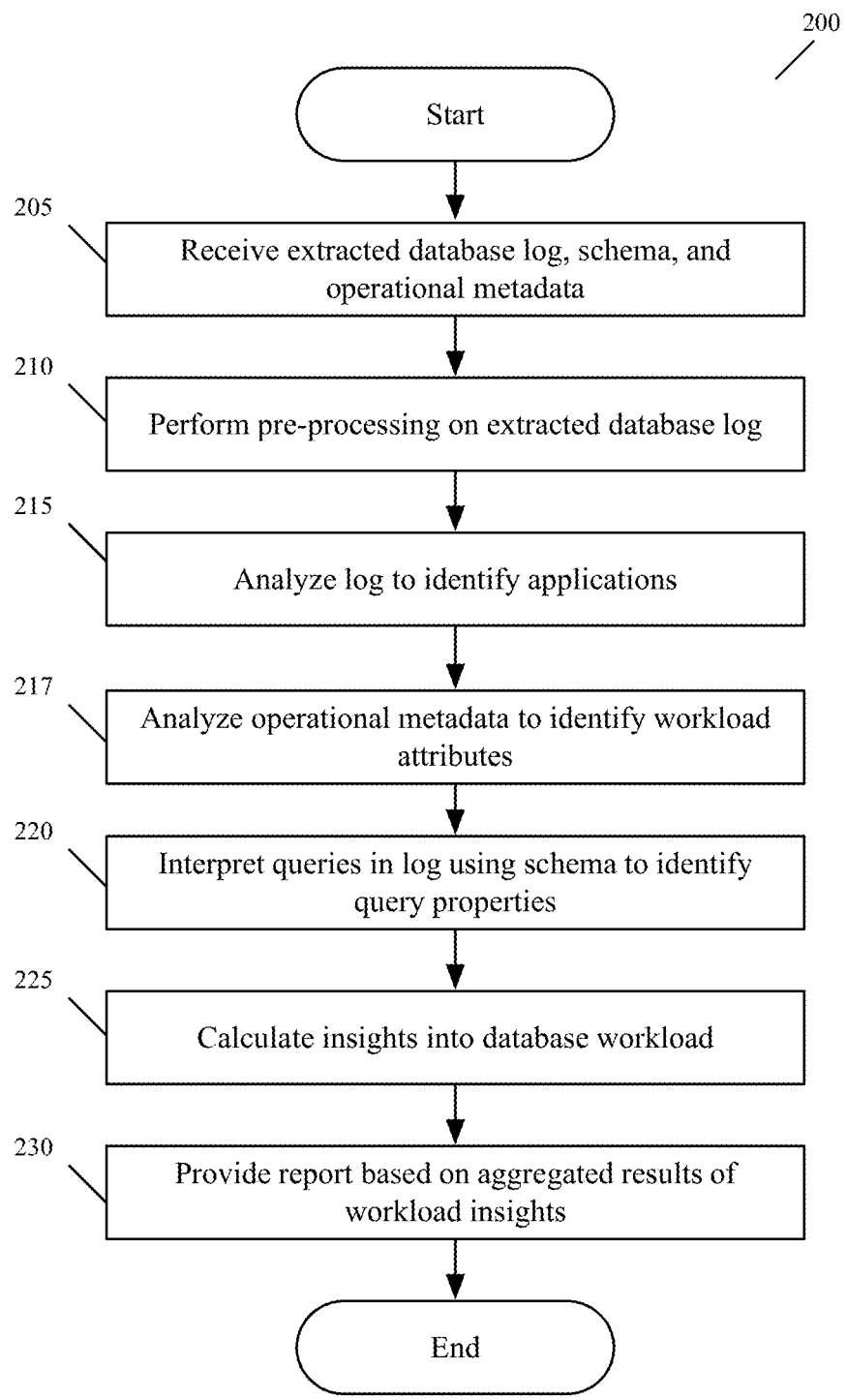
FIG. 2 conceptually illustrates a process of some embodiments performed by the database insight engine to analyze the database workload in order to derive workload insights.

FIG. 1 conceptually illustrates a database insight engine 105 of some embodiments that provides insight into a database 110. FIG. 2 conceptually illustrates a process 200 of some embodiments performed by the database insight engine 105 to analyze the database workload in order to derive these insights.

The database is accessed by at least one client system 112 that runs an application 115, which executes queries 117 on the database. In some embodiments, a client system runs more than one application, each of which executes its own queries. The objects stored in the database are described by the database schema 120 (also referred to as the database catalog), and the database generates a query log 125 and operational metadata 130 while performing the queries from the client applications 115. The log and metadata describe the database workload that the application queries place on the database.

The process 200 begins at 205 by receiving the database query log 125, schema 120, and operational metadata 130 from the database 110 for analysis. The process 200 performs pre-processing operations at 210 on the log, including consolidating queries across multiple log entries, removing duplicate queries, and organizing the queries according to client-database sessions, as will be described in further detail below.

The process 200 analyzes at 215 the queries in the log 125, in order to identify the applications that perform the queries. Each query in the log 125 is associated with an application identifier (or other attributes) that identifies which application issued the query. These application identifiers or attributes are unique to each application that accesses the database. The process 200 further analyses at 217 the operational metadata 130, in order to identify attributes of the workload. These workload attributes include throughput, data size, and unused data.

The process 200 also interprets at 220 each query in the log 125 to identify query attributes, query components, and properties of the query components. These properties are in some embodiments used to generate indicators that describe the complexity of the database workload on a per-query and a per-application basis. In some embodiments, the insight engine provides the schema and the queries to a database virtualization system (DVS) 135. The DVS 135 analyzes each query by instantiating the objects from the schema 120 and then interpreting the queries using the instantiated objects. The DVS 135 identifies the components of each query, and provides the properties of the components to the insight engine 105.

The process 200 uses the properties and attributes to calculate at 225 insights into the database workload. In some embodiments, these insights include a complexity indicator for each query 117, which are aggregated to determine a complexity indicator for each application 115. The process 200 then provides (at 230) a report of the workload insights gained from the results of the analysis. In some embodiments, the report is provided on a user interface 145. The process 200 then ends.

Figure 3:
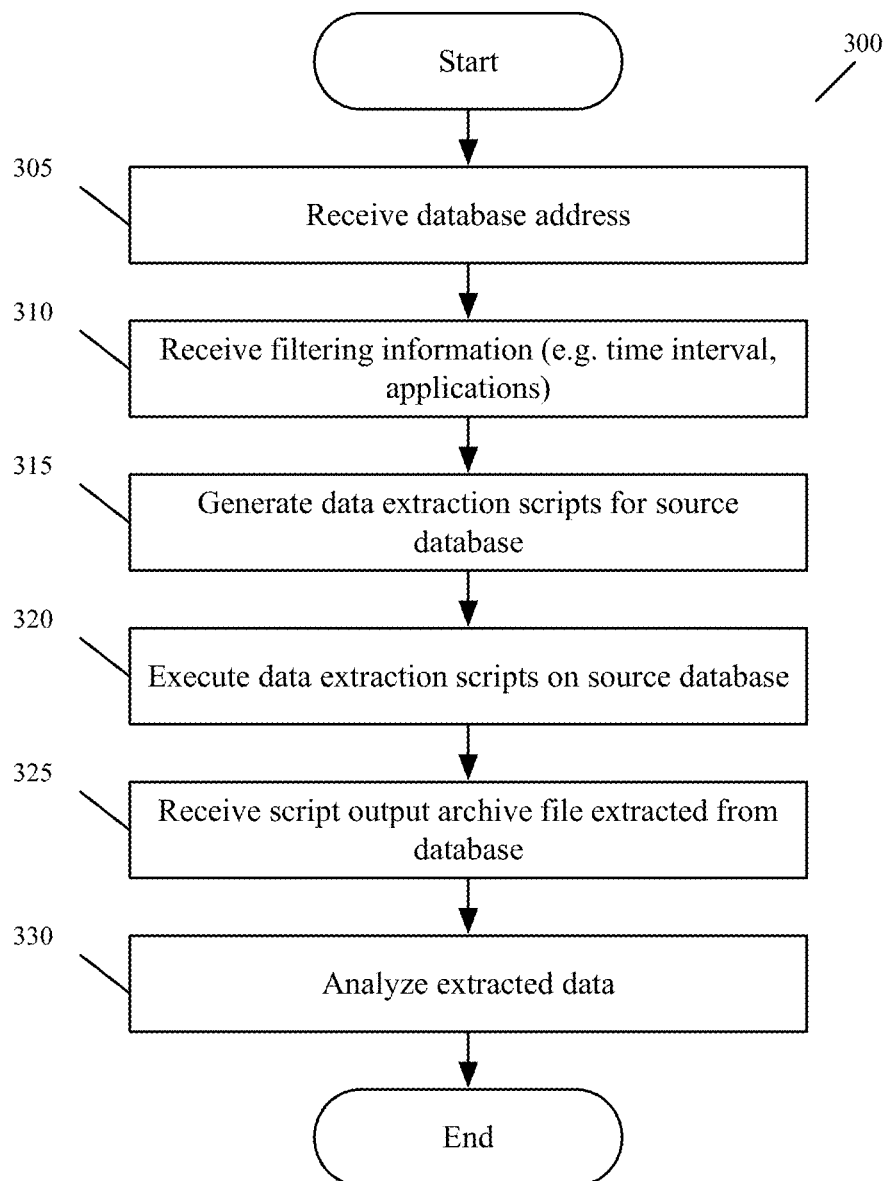
FIG. 3 illustrates a process performed by the database insight engine in some embodiments for receiving the log from the database for analysis.
Figure 4B:
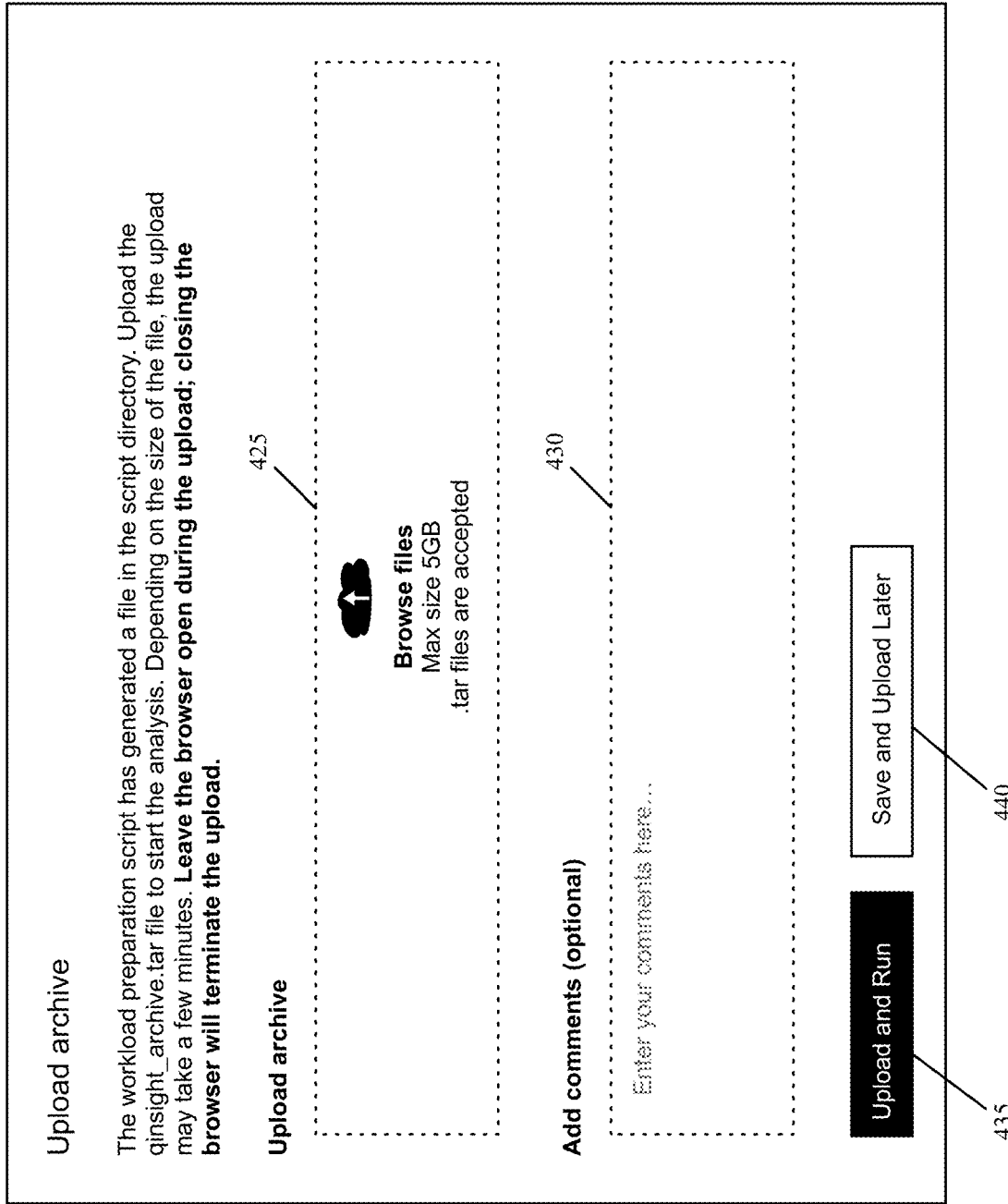

In some embodiments, the log is a log that is maintained by the database 110, while in other embodiments the log is a log that one or more programs (e.g., one or more scripts) extract from another log maintained by the database. The log also includes in some embodiments the schema 120 and the operational metadata 130. FIG. 3 illustrates a process 300 performed by the database insight engine 105 in some embodiments for receiving the log from the database 110 for analysis. FIGS. 4A-B conceptually illustrate the user interface 145 at various stages of performing process 300.

The process 300 begins by receiving through the user interface 145 (at 305) the address 405 of a server or host computer that hosts the database 110. In some embodiments, filenames 410 for individual tables of the database are also received, since these tables may be renamed by the database owner from their default (e.g., for security reasons).

The process also receives through the user interface 145 (at 310) filtering information. For example, the filtering information includes in some embodiments start and end dates 415 to specify a time interval for the analysis. The filtering information also includes in some embodiments specific applications (not shown) that the database owner wishes to evaluate.

After receiving all the information, the process 300 (at 315) uses the information to generate a data extraction script that is tailored to the database 110. In some embodiments, the process 300 generates the script when the user selects a control 420 (e.g., a button) on the user interface 145.

After generation, the script is downloaded by the database owner, who then executes it (at 320) on the database 110. In some embodiments the database owner provides administrative credentials through the user interface 145 (not shown), so that the process 300 can directly transfer and execute the generated script on the database 110. In other embodiments, the database owner manually uploads the script to the database, so that the database insight engine does not have access to the administrative credentials.

Executing the script creates an archive file as output. The process 300 receives at 325 the archive file, which in some embodiments contains a record of the queries issued on the database (e.g. the log), the database schema, and operational metadata generated by the database during query execution.

The process 300 receives at 325 the output archive from the database owner, who uploads it in some embodiments through a file selection control 425 of the user interface 145. In some embodiments, the database owner also specifies comments (e.g., indicating the context of the database, why it is being analyzed, etc.) via another user interface field 430. After selecting the file and entering any comments, the database owner indicates that the file is ready for upload and to initiate analysis by selecting another control (e.g., an "Upload and Run" button 435). The process 300 then performs the analysis at 330 and the process ends.

In some embodiments, the database owner has the option to save the file for later analysis (e.g., by selecting a "Save for Later" button 440). In such embodiments, the database owner can return to the user interface 145 at a later time, review the comments, select the desired uploaded archive, and select the user control to initiate the upload.

Figure 5:
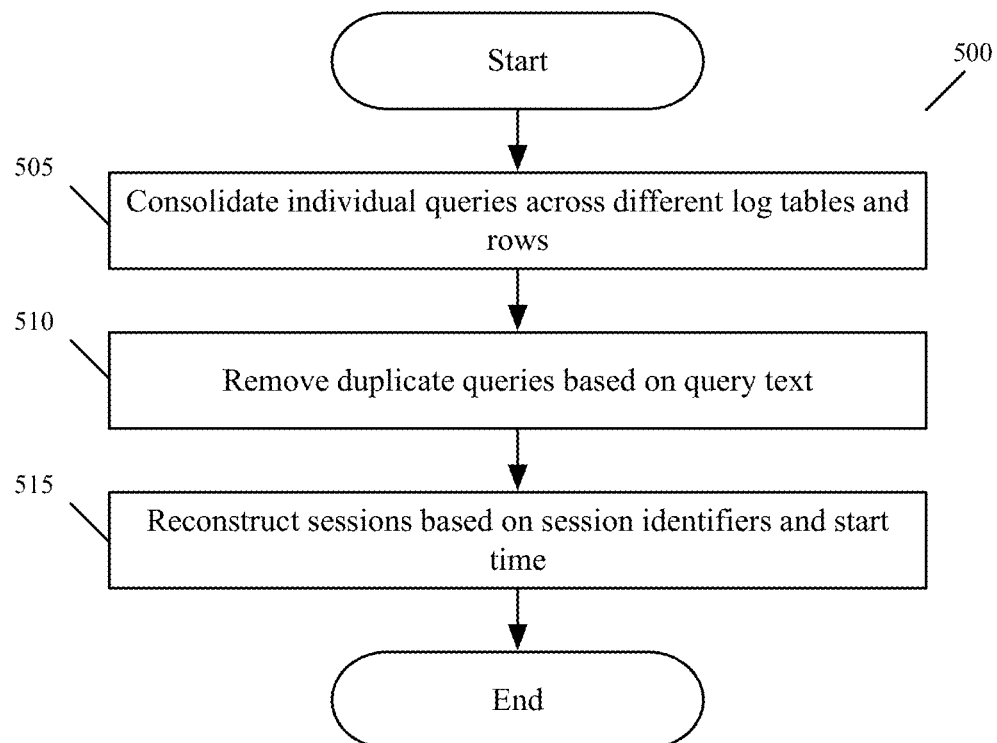
FIG. 5 conceptually illustrates a process performed in some embodiments by the database insight engine for pre-processing the log.

As discussed above with reference to operation 210 in FIG. 2, the database insight engine performs several types of pre-processing operations on the received log. This pre-processing shapes the workload to permit accurate and time-efficient analysis. FIG. 5 conceptually illustrates a process 500 performed in some embodiments by the database insight engine 105 for these pre-processing operations.

The process 500 begins at 505 by consolidating individual queries in the log. In certain database systems (e.g., Teradata) the logs are stored in multiple separate tables, such as a database query log (DBQL) log table that contains information about the queries being logged, and a DBQL SQL table that contains raw query text. Further, the SQL table store the raw text of a single (large) query across multiple rows in some cases, due to field size limitations. Therefore, individual query entries must be identified across the tables and the rows, (e.g., using a database-assigned query identifier), and then stitched together into a single entry prior to analysis. In some embodiments, this stitching is performed using a query identifier that is assigned by the database during generation of the log files during execution of the queries. In such embodiments, this database-assigned query identifier is unique for all individual queries, even if two queries are duplicates of each other.

Figure 6:
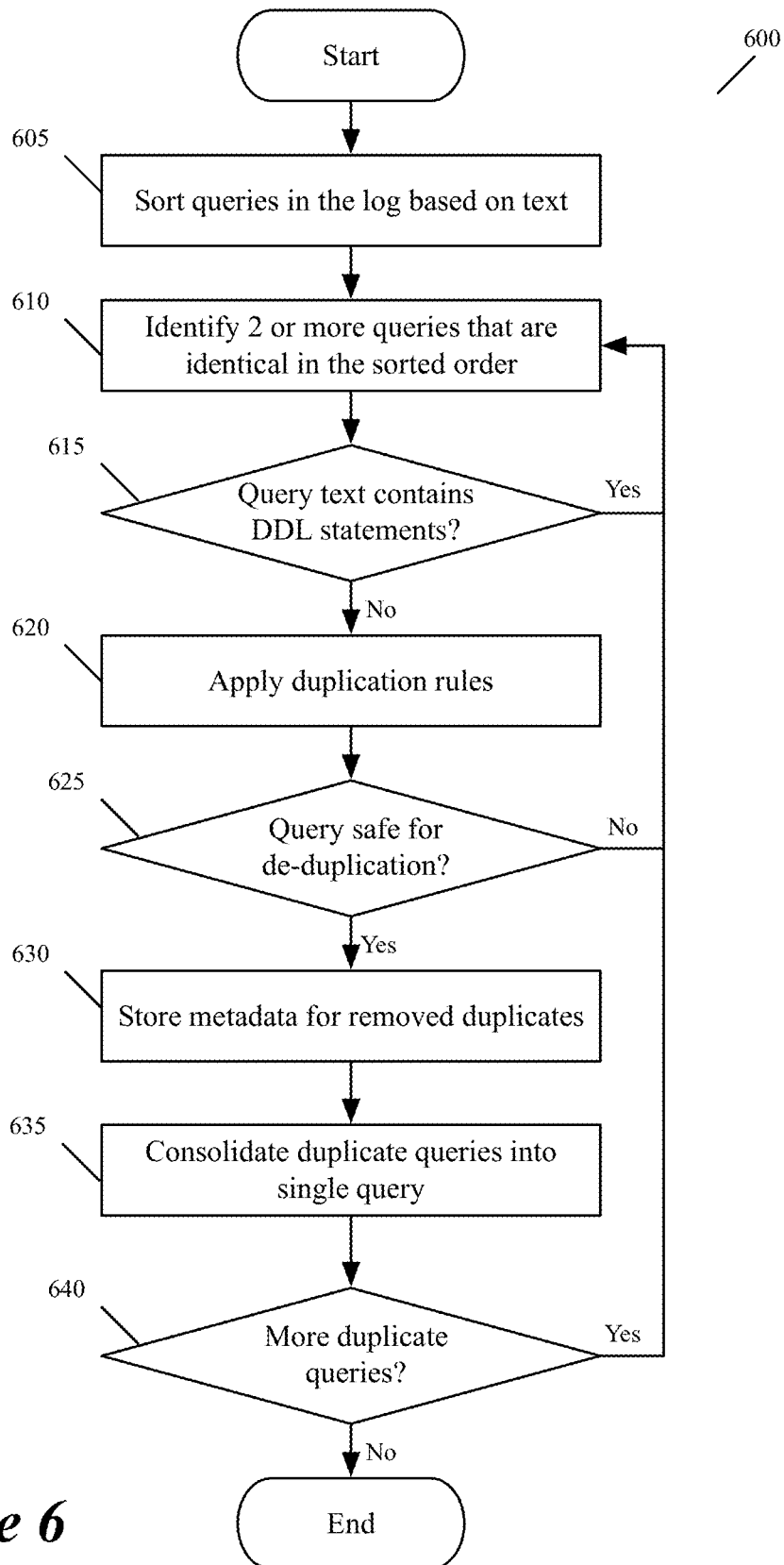
FIG. 6 conceptually illustrates the de-duplication process performed by the database insight engine in some embodiments.

The process further removes at 510 duplicate queries from the query log based on the text of the query. FIG. 6 conceptually illustrates this de-duplication process 600 performed by the database insight engine 105 in more detail. The process begins at 605 by sorting the queries in the log based on their text. From the sorted list of queries, the process 600 identifies at 610 two or more queries that all have identical text. In some embodiments, even though the queries are identical, they may have been issued by different users, clients, or applications (referred to as constituents).

The process 600 determines at 615 whether the text of the identified duplicates contains data definition language (DDL) statements. In some embodiments, queries that contain DDL statements (e.g., CREATE, ALTER, DROP, etc.) are not de-duplicated, because they may have an effect on subsequent queries in the session. If the process determines that the duplicate contains DDL statements, then the process returns to 610 and identifies the next set of duplicates.

If the process 600 determines that the query does not contain DDL statements, then the process applies at 620 a set of duplication rules. Rules are used in some embodiments to classify as unsafe for duplication those queries that may potentially affect objects, e.g. rules based on values of the statement type, the statement group, and the presence of semicolons in the query text (which potentially indicate multiple statement boundaries). Conversely, basic DML statements like INSERT and SELECT will not impact the analysis of other queries or affect database objects and are classified as safe for de-duplication based on these rules.

After applying the rules, the process 600 determines at 625 if the query was marked safe for de-duplication. If the query is not safe for de-duplication, the process returns to 610 and identifies the next set of duplicates.

If the query was marked safe for de-duplication, then the process 600 generates and stores metadata at 630 regarding the removed duplicate queries. The duplicates may have been issued by different "constituents" (e.g., applications, clients, or users). Accordingly, the metadata may include identifiers for each of these possible constituents, so that the removed queries may still be properly accounted for their contribution to the database workload from each constituent. The process 600 then consolidates at 635 the duplicate queries into a single entry.

After consolidating the query, the process 600 determines at 640 if there are any more identified duplicates. If so, then the process returns to 610 and identifies the next set of duplicates. If not, then the process 600 ends. In some embodiments, duplicate queries are removed on a per-log basis, whereas in other embodiments they are removed on a per-application basis.

Returning to FIG. 5, during pre-processing, the process 500 also reconstructs at 515 the sessions between the client 112 and the database 110. In some embodiments, the surviving queries are reorganized after de-duplication to reconstruct individual sessions between the client or applications that issued the queries and the database to which the queries were directed. If a particular session involves a temporary table, then queries that refer to that temporary table must be grouped into the same session where that temporary table is valid to ensure there are no errors, (e.g. "object not found").

Figure 7:
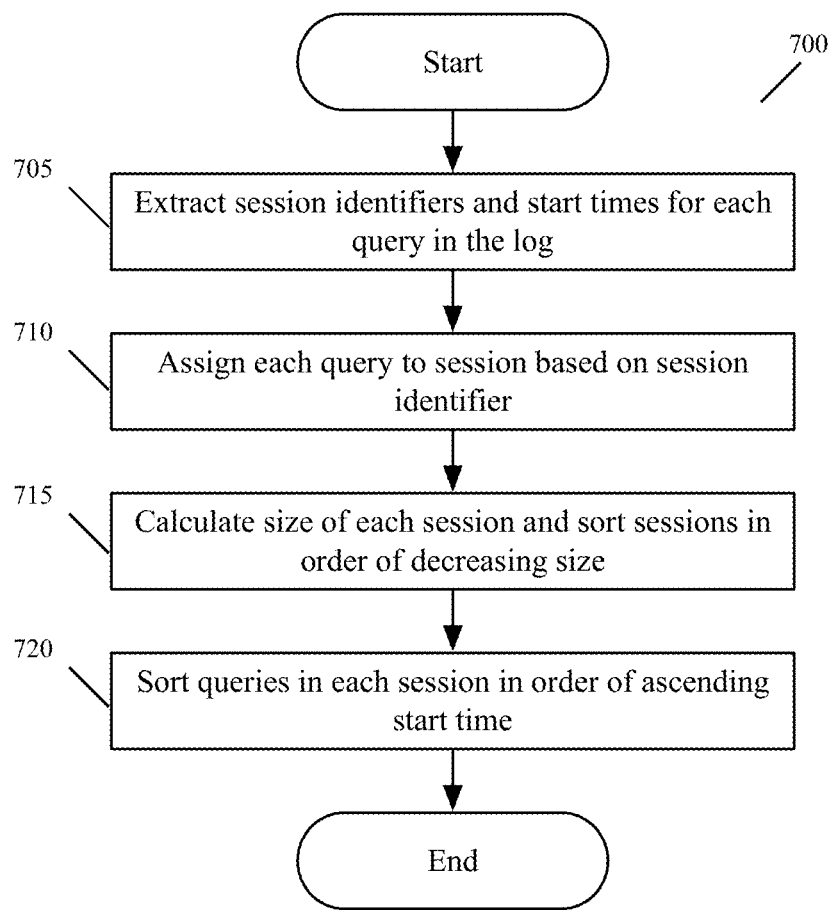
FIG. 7 conceptually illustrates a session reconstruction process performed by the database insight engine.

FIG. 7 conceptually illustrates a session reconstruction process 700 performed by the database insight engine 105 in more detail. The process 700 begins by extracting at 705 session identifiers and start times associated with each de-duplicated query in the log. The session identifiers are unique to each session between the client 112 and the database 110. The start times are the time stamp for each query for when it began execution on the database.

To construct the actual sessions, the process 700 assigns at 710 each query in the log to different sessions, based on the session identifier. All the queries in a session accordingly share the same session identifier.

For each constructed session, the process 700 calculates at 715 the session's size. In some embodiments, the size is calculated as the total number of queries in each session. In other embodiments, the size is calculated as the total number of characters of all the queries in each session. The sessions are then sorted in order of decreasing size, so that the largest sessions are processed first.

Within each session, the queries are sorted at 720 in order of ascending execution order (e.g., start time). This ensures that the queries are processed within a session in the same order that they were executed on the database 110. The process 700 then ends.

As a result of the process 700, for each session, the queries are processed in ascending execution order, and the sessions are processed (in some embodiments, by DVS 135 worker processes) in parallel. As each worker process completes processing a session, it is assigned the next largest session, as determined by the session size. In these embodiments, the largest sessions are started first, and smaller ones are started when there is room for them, to help all workers run out of sessions to process at roughly the same time.

Due to the de-duplication and the parallel processing of the sessions, in some embodiments the session reconstruction also results in temporal compression. Since the log could potentially contain queries over a substantial period of time (e.g. weeks or months, if not longer), real-time processing would take a comparable amount of time if the queries are processed in sequential order. By removing duplicate queries and reconstructing the sessions from the log for parallel processing, the queries are processed in time-accelerated fashion.

After completing the above pre-processing steps, the process 500 ends. As discussed above with reference to operation 215 in FIG. 2, after pre-processing is complete, in some embodiments the database insight engine 105 analyzes the log to identify a set of client applications that each generated one or more queries to the database, as well as objects used by these queries. In some embodiments, the received log includes for each query an application identifier (or set of other attributes) that uniquely identifies an application that generated the query. In these embodiments, the database insight engine identifies the set of client applications from the log by first identifying the queries in the received log, and then using the application identifiers to identify the application that generated the queries. From the identified queries, the database insight engine in some embodiments identifies sets of queries performed by different applications. The application identifier (or other attributes) is also used for computing an aggregate complexity score of an application, as is discussed with reference to FIG. 10 below.

As discussed above with reference to operation 220 in FIG. 2, in some embodiments, the database insight engine analyzes each query individually by interpreting the query to identify query attributes, query components, and properties of the query components. In these embodiments, the received log also includes the database schema (also referred to as the database catalog), which describes the objects stored in the original database. These objects are instantiated by the database insight engine, to provide a context for interpreting the queries. In some embodiments, this context is provided by using the instantiated database to populate a property derivation framework that stores properties associated with each of the components of the query and the objects that are referenced by the query. The database insight engine then interprets each individual query by reference to the instantiated database objects.

To identify the attributes or components of a query, the database insight engine of some embodiments performs a parsing operation to parse the query into an abstract query syntax from which the attributes and components can be identified. To do this, the database insight engine in some embodiments associates query components and properties identified from the abstract query syntax to another set of query components and properties defined for a database-independent form. In some embodiments, this association is performed as part of a transforming operation that a transformer module of the database insight engine performs on the query. In other embodiments, this association is performed as part of a transforming or binding operation that a binding module of the database insight engine performs on the query. Both the transformer and the binder modules will be described in further detail below with reference to FIG. 8. Properties associated with the set of components are identified in some embodiments by the binder module or the transformer module by using the property derivation framework.

Figure 8:
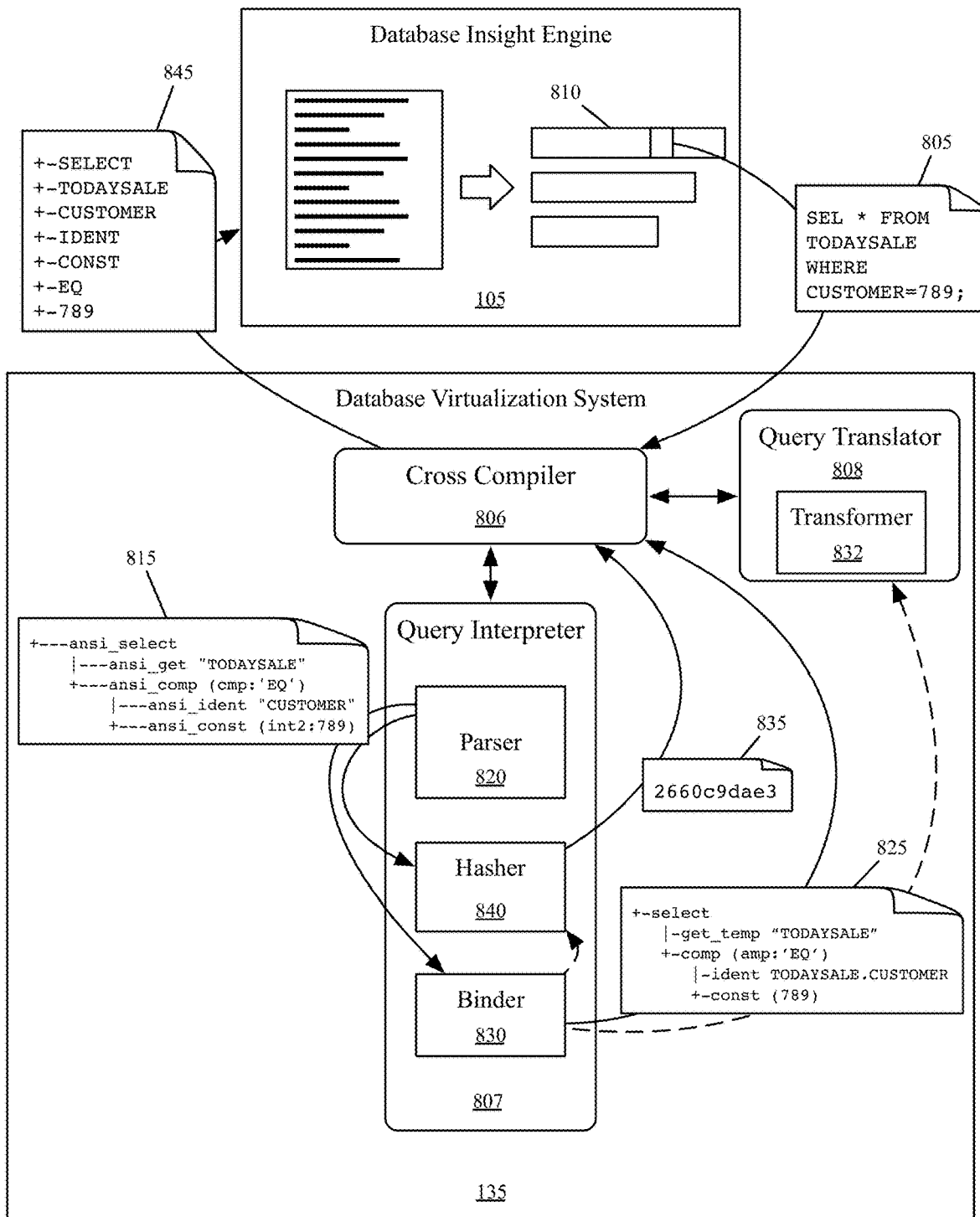
FIG. 8 conceptually illustrates the interaction in some embodiments of the database insight engine with the database virtualization system (DVS).
Figure 9:
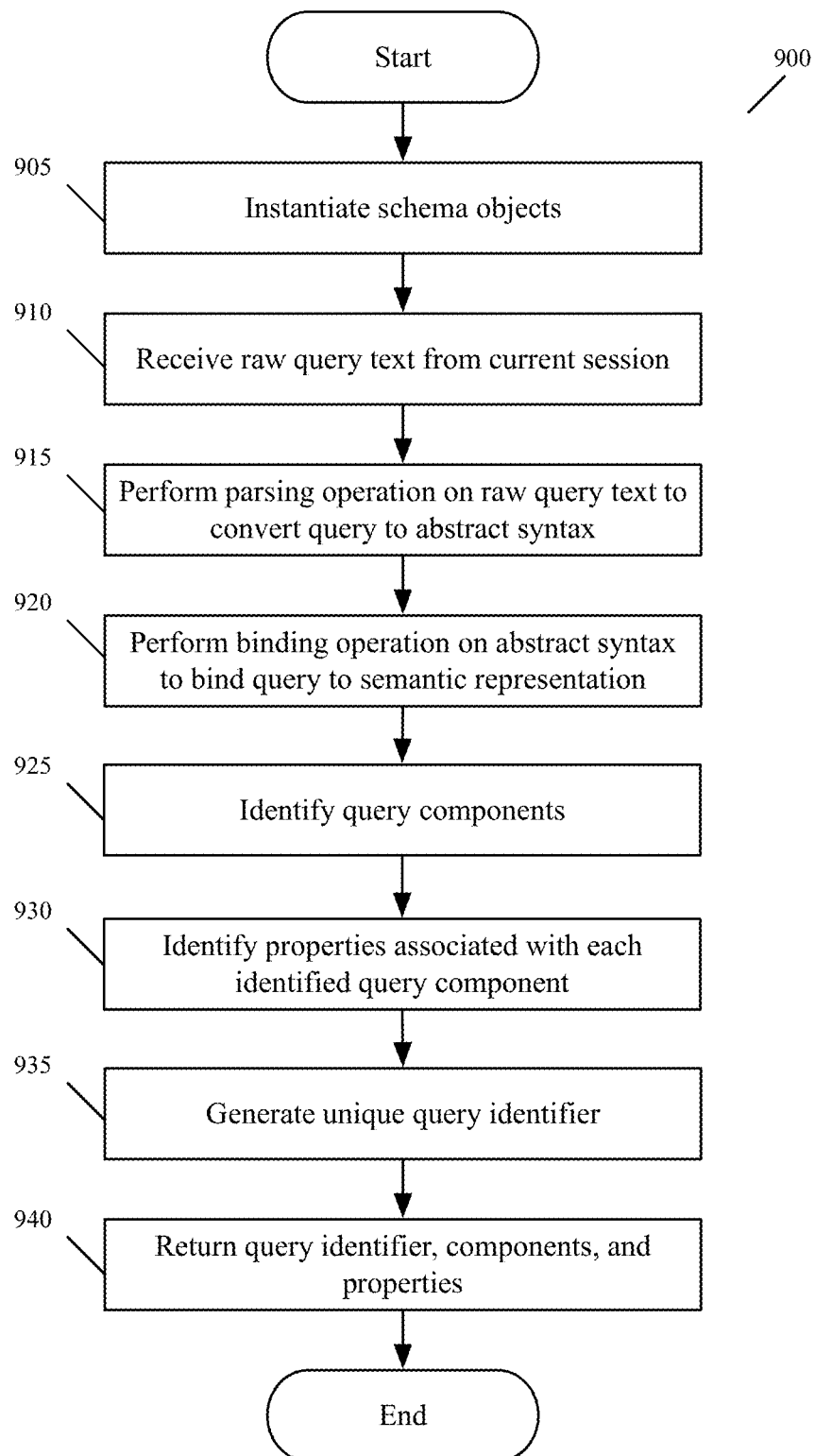
FIG. 9 conceptually illustrates a process performed by the DVS to analyze a query.

In some embodiments, the database insight engine uses an adaptive database virtualization system (DVS), such as Datometry Hyper-Q, for analyzing the queries (e.g., performing the parsing, binding, and transforming operations described above) and identifying properties of the query components. FIG. 8 conceptually illustrates the interaction in some embodiments of the database insight engine 105 with the database virtualization system (DVS) 135. FIG. 9 conceptually illustrates a process 900 performed by the DVS to analyze a query.

The process 900 begins by instantiating at 905 the schema objects received from the database insight engine. The process 900 then receives at 910 a single query 805 for analysis. As noted above, in some embodiments this query belongs to a certain session 810 that has been assigned to the process 900, and is being processed in order of ascending execution order relative to other queries in the session.

The process 900 receives the query 805 at a cross compiler module 806 that coordinates query processing by a query interpreter module 807 and a query translator module 808. The process 900 parses at 915 the raw text of the received query 805 into an abstract syntax 815. In some embodiments, the parsing operation is performed by a parser module 820 of the query interpreter 807. During parsing, the parser 820 performs a syntactical interpretation operation on the received query 805 to convert the query to the abstract syntax representation. One example of such a syntactical interpretation operation is a text replacement operation for converting a non-standard SQL command keyword (e.g., SEL) into standard SQL equivalents (e.g., ansi_select).

The process 900 associates at 920 the parsed query 815 to an algebraic representation 825 that is in a form that is independent of any database (e.g., an SQL representation). In some embodiments, this association is a part of a binding operation performed by a binder module 830 of the query interpreter 807. The binder module 830 performs a semantic interpretation operation on the parsed query, to convert it from the abstract syntax to the database-independent form. One example of this semantic interpretation operation is to reference names such as tables and views by performing metadata lookups and normalizing the query tree. In other embodiments, this association is part of a transforming operation, performed by either the binder module 830 or a transformer module 832 (which in some embodiments is a component of the Query Translator module 808). The transformer module 832 in some such embodiments performs the semantic interpretation operation on the parsed query, to convert it from the abstract syntax to the database-independent form. In some such embodiments, the transformer module 832 also converts the query from the database-independent form to a different query syntax.

The process 900 identifies at 925 the components of the query 805. In some embodiments, these components include query attributes such as size of the query, number of lines of code, objects (e.g. tables) that are touched by the query, and other query-specific information. In some embodiments, at least some of the identified components are syntactic components identified using the abstract syntax. Examples of such syntactic components include commands (e.g., ansi_select), operators (e.g., EQ), and constants (e.g. integer value 789). In some such embodiments, these syntactic components are identified by the parser module 820. Alternatively or conjunctively, at least some of the identified components are semantic components identified using the database-independent form. Examples of semantic components include SQL commands (e.g., select), referenced database objects (e.g., CUSTOMER) and temporary tables (e.g., TODAYSALE). In some such embodiments, these semantic components are identified by the binder module 830 of the query interpreter 807. In other such embodiments, these semantic components are identified by the transformer module 832 of the query translator 808.

The process 900 identifies at 930 various properties associated with each identified component. Examples of such properties include component identifiers, component types (object, operator, etc.), the count of the number of occurrences of the component in the query text, and base tables associated with the component. In some embodiments, the properties are identified using a property derivation framework (not shown) that is populated when the schema objects from the database 110 were instantiated. In such embodiments, the parser module and/or the binder module use the property derivation framework to derive properties such as query type (select/insert/delete, etc.), output columns of operators, and data types of expressions.

In some embodiments, the semantic components and/or properties are identified by the query translator module 808, e.g. by a serializer component (not shown) and/or a query transformer 832 component of the query translator 808. In some such embodiments, the binder module 830 provides the abstract syntax 825 to the query translator module 808 (as indicated by the dashed line). The query translator then provides the components and/or properties to the cross compiler 806 for returning to the database insight engine 105.

The process 900 also generates at 935 a unique identifier 835 for the query. The identifier is generated in some embodiments by a hasher component 840 of the query interpreter 807, that computes a hash value from the query. For example, in some embodiments, the hash value is calculated by treating the entire query as a single string. In some embodiments, the query string is the abstract syntax 815 received from the parser 820. In other embodiments, the query string is the database-independent form 825 received from the binder 830 (as indicated by the dashed line). In other embodiments, the query identifier is calculated as a Merkle tree over nodes of the abstract syntax 815 or the database-independent form 825.

In still other embodiments, the hash value is calculated from the identified query components and properties. For example, the hash value is calculated from the query components by hashing each component's identifier. In some such embodiments, the component identifiers are sorted into a particular order (using various criteria such as alphabetical, length, order of operation priority, etc.). In some such embodiments the component identifiers include semantic component identifiers, syntactical component identifiers, or some combination of both types of identifiers. These component identifiers are identified in some embodiments from the database-independent form instead of the database-dependent syntax (e.g., the abstract syntax).

After computing the query identifier and identifying the query components and properties, the process 900 provides them at 940 to the cross compiler 806. The cross compiler than returns them to the database insight engine 105. In some embodiments, the results are provided in a data storage structure 845 that contains the identified query components and their properties, as well as the unique query identifier 840. The process 900 then ends.

As described above, in some embodiments, the query identifier is calculated from the query components by the database virtualization system (DVS) 135, which then provides it to the database insight engine 105. However, in some embodiments, the DVS cannot identify all the query components or fully represent the query in the abstract syntax and/or the database-independent form. For example, the query contains in some embodiments non-standard SQL features (e.g., macros, stored procedures, updateable views), data types (e.g., PERIOD), column properties (e.g., case sensitivity) or other features. In such a case, the DVS still calculates a hash value from the raw text 805 of the query rather than the query components. In other embodiments, the database insight engine itself calculates the hash value in case of an error from the DVS 135. In such embodiments, the process 900 also returns the error at 940 to the database insight engine.

As discussed above with reference to operation 225 in FIG. 2, the database insight engine 105 calculates a number of insights into the database workload. For example, based on the properties identified for each set of queries, the database insight engine in some embodiments generates a complexity indicator that represents a level of difficulty to understand the set of queries, e.g. by a person or machine. In some embodiments, the complexity indicator also represents a level of difficulty in rewriting the set of queries for another database, such as a candidate database for migrating the data from the original database. The database insight engine also in some embodiments includes in the generation of the complexity indicator various query attributes, derived from analysis of the query by either the DVS 135 or by the database insight engine itself, or extracted from the logs.

The complexity indicator in some embodiments is a category of complexity, e.g. low, medium, and high. In some embodiments, the complexity indicator represents a complexity expression of the database query, that is a value that quantifies the degrees of complexity of a database query. In some embodiments, the complexity expression of individual queries is also aggregated over the query workload from a specific application or other constituent, or over the entire database workload. These degrees of complexity describe in some embodiments the understandability of the query by a human or a machine, such as understanding what the query does, what its components are, etc. In some embodiments, the degrees of complexity alternatively or conjunctively describe how difficult it is to rewrite the query to have the same result, when executed on or submitted to a different database than its original database (for which the query was natively intended to run prior to rewriting). The degrees of complexity also describe in some embodiments the verifiability of the query's results, if rewritten and executed on another database, in comparison to the results of executing the query on the original database.

In some embodiments, the complexity indicator is quantified by the database insight engine with a numeric complexity score that is useful as a proxy for migration and query/application rewriting cost and other variables. The overall complexity of a workload is a combination of the complexity of the individual queries in the workload mix and the complexity of the underlying schema.

As further described below, the database insight engine in some embodiments calculates the complexity score for each application's queries by analyzing the queries individually to identify the components of the queries, and generating complexity scores for the individual queries based on complexity values associated with the components and patterns within the queries.

In embodiments where the query includes a number of individual statements, the query complexity score is calculated based on the aggregate complexity scores of the query's statements, based on the components of each statement. Complexity scores are also calculated in some embodiments for objects such as views, for example based on queries that define the object, and/or queries that reference the object.

Individual complexity scores for queries are aggregated in some embodiments by application, client, and other dimensions of the workload. These aggregate complexity scores are used in some embodiments as a proxy for the database resources and cost required to support the database workload, and to assess the relative cost in resources, time, and money for migrating some or all of the workload to a different database. The database insight engine then includes the aggregate complexity scores in a report in order to identify the complexity of understanding and rewriting each application. In some embodiments, the aggregate complexity scores are also used as a proxy to assess the relative cost in resources, time, and money for verifying the results from queries executed by the rewritten applications on the new database after migration.

In analyzing the queries, the database insight engine in some embodiments removes duplicate queries by only maintaining one query out of several queries that have the same semantic structure, e.g., the same set of query components. In some embodiments, these duplicates do not have identical text (e.g., syntactical structure). Two queries may have different syntactical structure and still have identical semantic structure, and thus be identified as duplicates. As an example, one query may define a variable "A=5" and another query may define the same variable as "A=10," in which case the two queries are semantically both assigning a constant value to the variable. These constants are semantically insignificant parts of the query. Hence, these queries are considered in some embodiments to be semantic duplicates even though the syntactical components (namely, the constant value) are different. The database insight engine removes semantically duplicate queries from the complexity calculation in some embodiments, as it does not need to assess duplicate queries to compute the same complexity score multiple times for two or more queries that have the same semantic structure.

While removing duplicate queries, the database insight engine in some embodiments generates metadata (e.g., count values) regarding the removed duplicate queries, and then uses the generated metadata to express the complexity indicators for the queries associated with a client application.

In some embodiments, complexity indicator is a complexity score that is calculated by the database insight engine for each semantically unique query in the set of queries. The complexity scores are then aggregated over all the queries in the set, in order to obtain an aggregate complexity score that represents the level of difficulty in understanding the queries, rewriting the queries for another database, and verifying the results of the rewritten queries when executed on the other database after migration. This aggregation uses the metadata generated during the duplication removal in computing the aggregate complexity score, so that the complexity score contribution of a semantically unique query that is issued by multiple applications is still properly counted towards all those applications' aggregate complexity scores.

Figure 10:
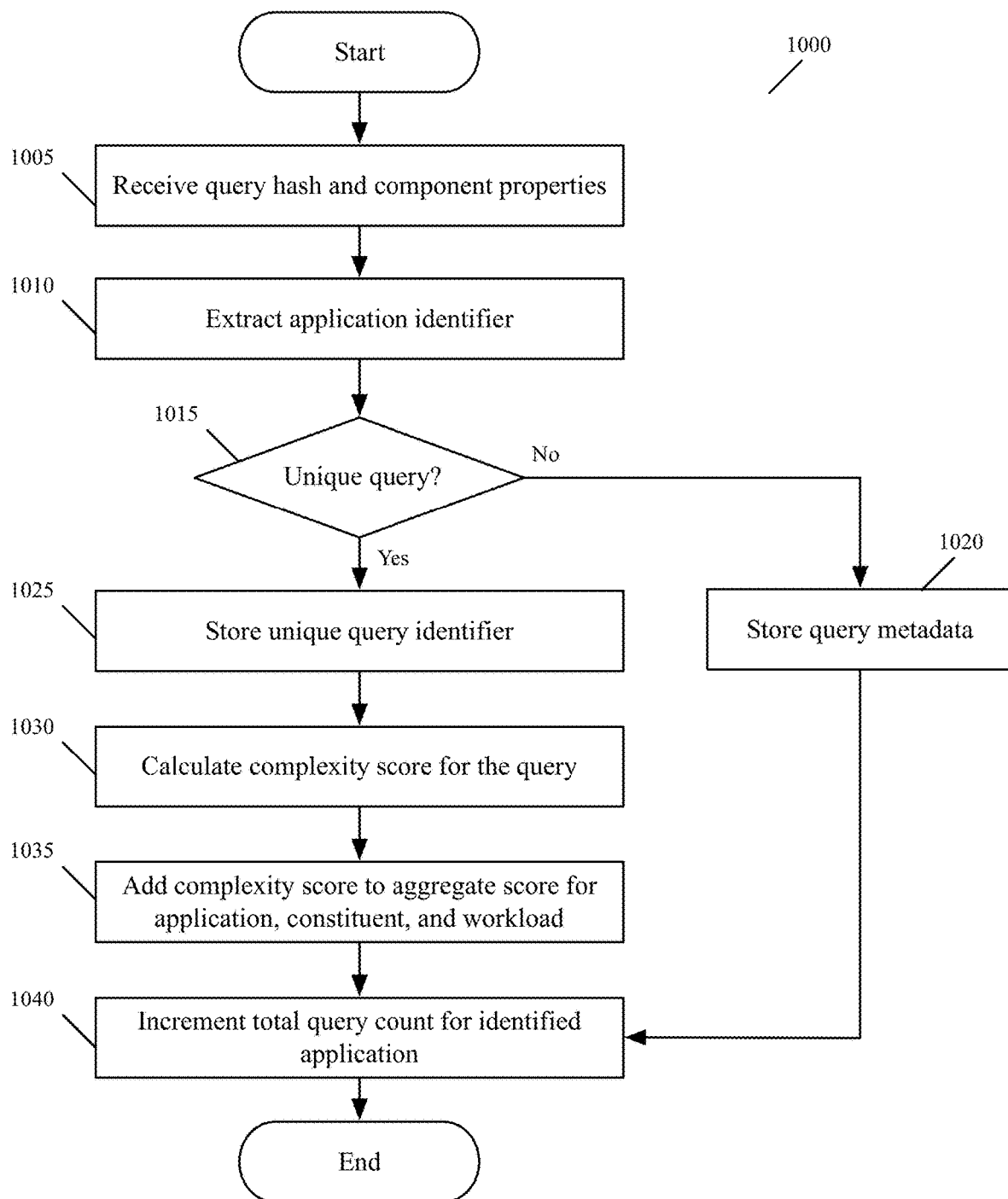
FIG. 10 conceptually illustrates a process performed by the database insight engine of some embodiments for calculating the aggregate complexity score for an identified application.

FIG. 10 conceptually illustrates a process 1000 performed by the database insight engine 105 of some embodiments for calculating the aggregate complexity score for an identified application. The process begins at 1005 by receiving from the DVS 135 the unique query identifier (e.g., hash values), query components, and component properties, for a query. In some embodiments, the database insight engine 105 generates the unique query identifier, e.g. from the query text or from the received query components and properties, instead of receiving it from the DVS 135.

In some embodiments, the received properties include a grouping of the components according to a set of component types and a number of each component type in the database query. The number for each component type is used in some embodiments to calculate the complexity score for the query. In some embodiments, the database insight engine 105 counts the number of each component type, instead of receiving it from the DVS 135.

After receiving the query identifier and the properties, the process 1000 extracts at 1010 an application identifier that identifies which application issued the query. The identifier is extracted from the log in some embodiments prior to processing the query by the DVS, or is returned in other embodiments as a query property after processing by the DVS. In some embodiments, the identifier is a constituent identifier that identifies another type of constituent that issued the query instead of an application, e.g. a database user or a database client.

The process 1000 uses the received query identifier to determine at 1015 whether the query is a unique query. In some such embodiments, the query identifier incorporates the application identifier (or another constituent identifier). If the process determined that the query identifier matched a previously stored query identifier, then the query is considered a duplicate of at least one previously processed query. The process 1000 then stores metadata (at 1020) that is associated with the duplicate query (e.g., the application identifier or other constituent identifiers) to ensure that during aggregation (described below) the complexity of the duplicate is correctly assigned to any applications or other constituents for which the complexity score is being aggregated. The process 1000 then continues to 1045 which is described below.

If the process determined that the query identifier did not match a previously stored query identifier, then the query is considered a unique query that is not a duplicate of any previously processed query. The process 1000 then stores at 1025 the unique query identifier for comparison to future queries.

The complexity score for the query is computed at 1030. In some embodiments, each of the component types has a cost value associated with it, and the complexity score is calculated as a weighted sum of the cost values for the query components. In some of these embodiments, each component type's cost value is the weight value. In other embodiments, each component type's cost value is added with the other cost scores of the query's other component types using separate weight values for normalization. In some embodiments, the cost values depend only upon the original database whose workload is being analyzed. In other embodiments, however, the cost values also depend on what target database is being considered as a candidate for migration.

In some embodiments the weights are assigned using a lookup table. The weight values in the lookup table is pre-calibrated in some such embodiments by reference to a standardized query workload used for database performance testing, such as TPC-H. In other such embodiments, the calibration of the weights is performed using a linear regression.

Alternatively or conjunctively, the query complexity score is calculated at 1030 by using other properties of the query components besides counts of component types. In some embodiments (not shown), the process 1000 stores the computed query complexity score as query metadata associated with the unique query identifier.

In some embodiments, the complexity score represents an intrinsic complexity of the original query (or aggregate of queries, by application, other constituent, or total workload). A query that is multiple pages long is more complex for example than a single line query, in most cases. Alternatively or conjunctively, the complexity score also represents the complexity of understanding and rewriting the query for a different database, in the scenario of database migration. As a result the complexity score (or a portion of the score, or a second complementary score) varies in some such embodiments based on what target database for migration is selected (provided, for example, as an argument to the database virtualization system 135 by the database insight engine 105 when providing a query for analysis).

The complexity score for the query is then added at 1035 to an aggregate complexity score for the application identified by the application identifier (at 1010), to compute the total complexity score for each identified application. In some embodiments, the complexity scores are aggregated as a running total that is updated as each query is processed. In other embodiments (not shown), the complexity scores of the entire query cohort, or in some embodiments a session cohort, are processed first, and then the results of the cohort are processed to aggregate them by application identifier. In some embodiments, other aggregations are also performed, such as by user of the database, by database client, or any other constituents for which there are identifiers, which were identified during operation 1010.

As discussed above, in some embodiments the complexity scores are also dependent on the candidate database for migration. In some embodiments, these aggregate complexity scores are in some embodiments a compatibility score, that represents the compatibility of the workload from the application or other constituent, or the overall workload as a whole, with a specific candidate database. In other embodiments, such as those where the complexity scores are not dependent on the candidate database, the aggregate complexity scores are a portability score that represents the portability of the workload from the application or other constituent, or the portability of the overall workload as a whole.

In some embodiments, duplicate queries are not included in these aggregate complexity scores in some embodiments. This avoids an inflation of the complexity score due to repeated queries. These duplicates are effectively removed from the aggregation process by the determination at 1015. In other embodiments, duplicate queries are included in the aggregate complexity score. In such embodiments, the complexity score for the duplicated query is retrieved (not shown) from the storage of the query metadata, where it would have been stored during operation 1030. In some embodiments, duplicates of certain types of queries are included in the aggregate complexity scores, whereas duplicates of other types of queries are not included in the aggregates.

The process 1000 uses the application identifier to increment at 1040 a query counter (i.e., metadata) associated with the application, in order to keep track of the total number of queries issued by the application. Query counters for other identified constituents are also incremented as available. In some embodiments, if the query had been determined to be a duplicate in operation 1015, then the query will still be included in the query count for the application or constituent. In other embodiments, duplicate queries are excluded from the query count, or excluded based on the type of query. The process 1000 then ends.

In some embodiments, the identified set of components for a query includes a reference to a set of one or more objects in the database, and at least one command that specifies an operation with respect to the set of referenced database objects. The identified set of properties for the query components in some embodiments includes a command type for the command and a set of attributes associated with the referenced database objects, such as the number of referenced database objects, the object types for the referenced database objects, etc. In some embodiments, a component type specifies whether the referenced object is one of a persistent table, a temporary table (e.g., global temporary tables), a view (including updateable views), a column, a macro, and a stored procedure.

The command type in some embodiments also specifies whether the command is a SQL command and a non-SQL command. Some examples of SQL command types are SET, SELECT, INSERT, UPDATE, MERGE, DELETE, CREATE, GROUP BY, and UPSERT. Some examples of non-SQL command types are a bulk load command, a bulk export command, a bulk import command, and a backup command.

In some embodiments, the identified set of properties specify a database operation type for the operation specified by the command. Examples of operation types include an inner join operation, an outer join operation, an implicit join operation, and a partition operation (e.g., a table partitioning clause). Also, in some embodiments, the identified set of properties includes a function type for a function used in the operation specified by the command. Examples of function type include a data filtering function, a windowing function, a data format function, a string format function, a date manipulation function, a case sensitivity cast function, a subquery (including correlated subqueries and vector subqueries), aggregate functions, and a recursive construct.

The identified properties for a query also include in some embodiments the number of lines of code in the query and in any macros or stored procedures, syntax differences that can be replaced syntactically (i.e. regex, search and replace, etc.), and the deepest nesting level of joins and/or subqueries. They also include in some embodiments unsupported scalar types, exotic types (e.g. BLOBs), SET tables, default expressions, unique constraints, columns with DATETIME precision, and triggers.

As discussed above with reference to operations 217 and 225 in FIG. 2, some embodiments of the database insight engine 105 also identify or calculate a set of workload attributes that quantify the impact of performing the queries on the database. In some embodiments, the workload attributes are identified based on an analysis of operational metadata that is generated by the database during execution of the queries. In some embodiments, the operational metadata is included in the received log. The database insight engine then includes the workload attributes in a report in order to further characterize the workload.

Some of the workload attributes are associated with the identified applications. For example, these attributes include a count of the queries performed by each application, a count of database objects referenced by queries performed by each application, and a throughput of queries performed over a unit interval of time by each application. In some embodiments the count of queries is a count of unique queries after removing duplicate queries.

Some of the workload attributes are global attributes that describe the workload of the database overall. For example, these attributes include a number of queries in each of a set of query types, a count of database constructs (e.g., database objects and schemas) referenced by the queries, a total size of the database, a throughput of the queries performed on the database over a unit interval of time, and a count of unused database objects that were not referenced by the queries. In such embodiments, the count of the database constructs is a count of the number of constructs of different types. In some of these embodiments, the throughput of queries includes a peak throughput and an average throughput and the unit interval time is expressed in minutes, hours, and days.

As discussed above with reference to operation 217 in FIG. 2, the database insight engine 105 aggregates the results of its calculated insights (identified applications, complexity scores, and workload attributes) into a report provided through the user interface 145. In some embodiments, the user interface allows the user to select a period of time and specific database applications for filtering the workload to be analyzed. The user interface is provided over the Internet, or another network. In some embodiments, the user specifies (via the user interface) the location of the database instance to be analyzed such as an IP address or a Uniform Resource Locator (URL). The user also specifies other relevant details, such as log table name and SQL table name, of the database to introspect. In some embodiments, the user interface also allows the user to select a period of time and specific database applications for filtering the workload to be analyzed. In some embodiments, the user also specifies a candidate database system to evaluate as a replatforming target. In such embodiments, the pre-processing of the received log is optimized for the selected candidate database.

In some embodiments, the report generated by the database insight engine provides a concise summary of insights into the database workload to inform a user decision to re-platform the original database. Re-platforming the database involves migrating the stored data in the database to a new database, and migrating applications that have access to the database so that they still work in relation to the migrated data on the new database. In some embodiments, the database is re-platformed to a different database type which may or may not support the same features as the original database, but may provide cost or performance advantages. In other embodiments, the database is re-platformed to a new database of the same type, in order to optimize the database and applications to obtain the performance or cost advantages. The report generated by the database insight engine provides insight into which new databases makes the best candidates for re-platforming, which apps are most essential, and how difficult (e.g., in terms of time or cost) the migration process will be. FIGS. 11A-H illustrate examples of insights provided by the report in some embodiments.

In some embodiments, the report includes an executive summary of what was analyzed, such as the version of the database, and the time period being analyzed. In some embodiments, the report is organized into different "buckets" of information tailored for different purposes. These buckets include functional, operational, governance, and performance-related purposes.

Figure 11A:
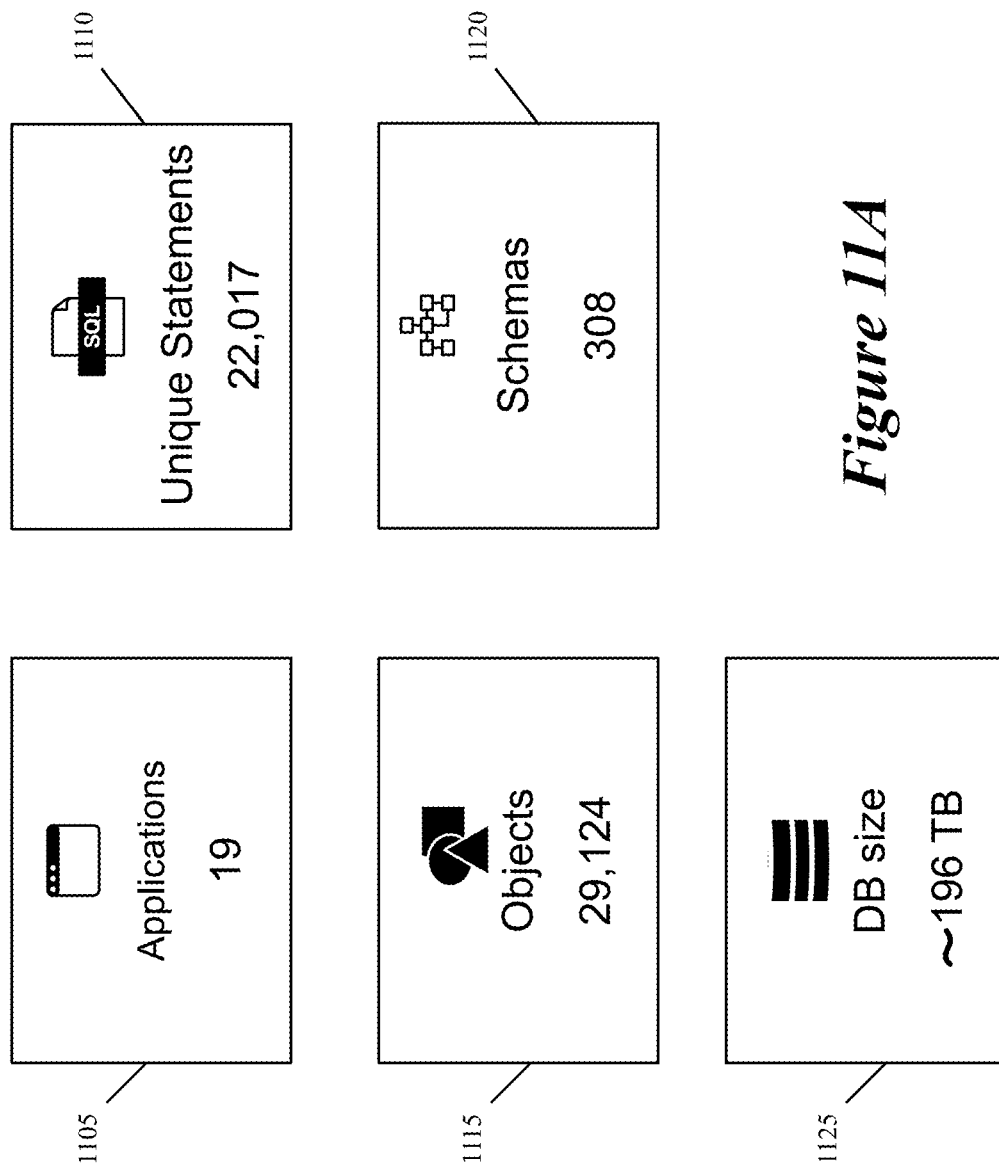
Figure 11B:
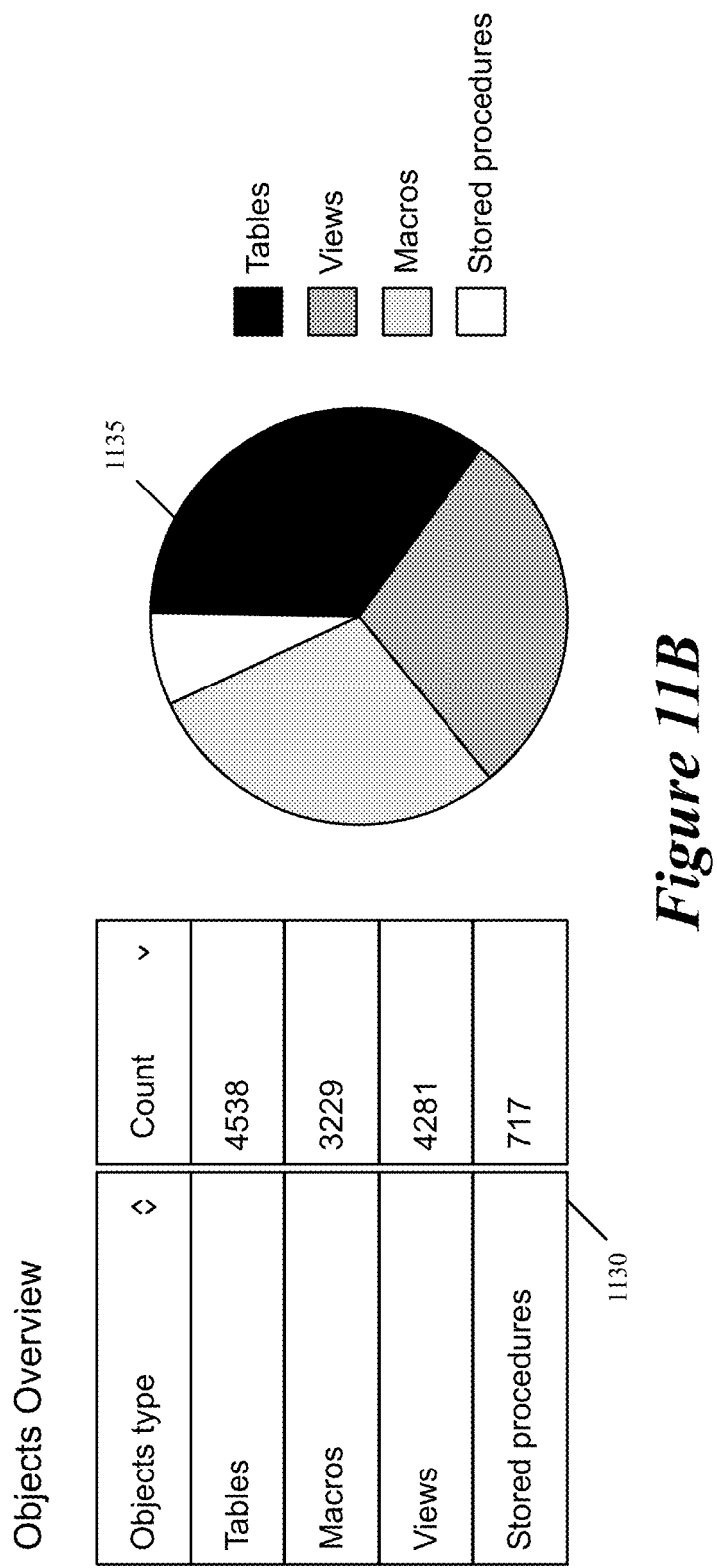

FIG. 11A illustrates an example report in some embodiments that includes basic statistics about the database workload. These global statistics include the number of applications 1105 and the number of unique queries or statements 1110. In some embodiments, the report also includes physical information about the database schema such as the number of database objects (e.g. tables, views, macros, stored procedures) 1115 and schemas 1120 and the total size of the database 1125. FIG. 11B illustrates a report of the number of each type of database object in some embodiments, broken down into tabular 1130 and visual 1135 form. This information allows the user to assess the physical requirements of their workload and to prioritize migration of the largest database objects. For example, the user could then use this information to break the migration into phases.

Figure 11D:
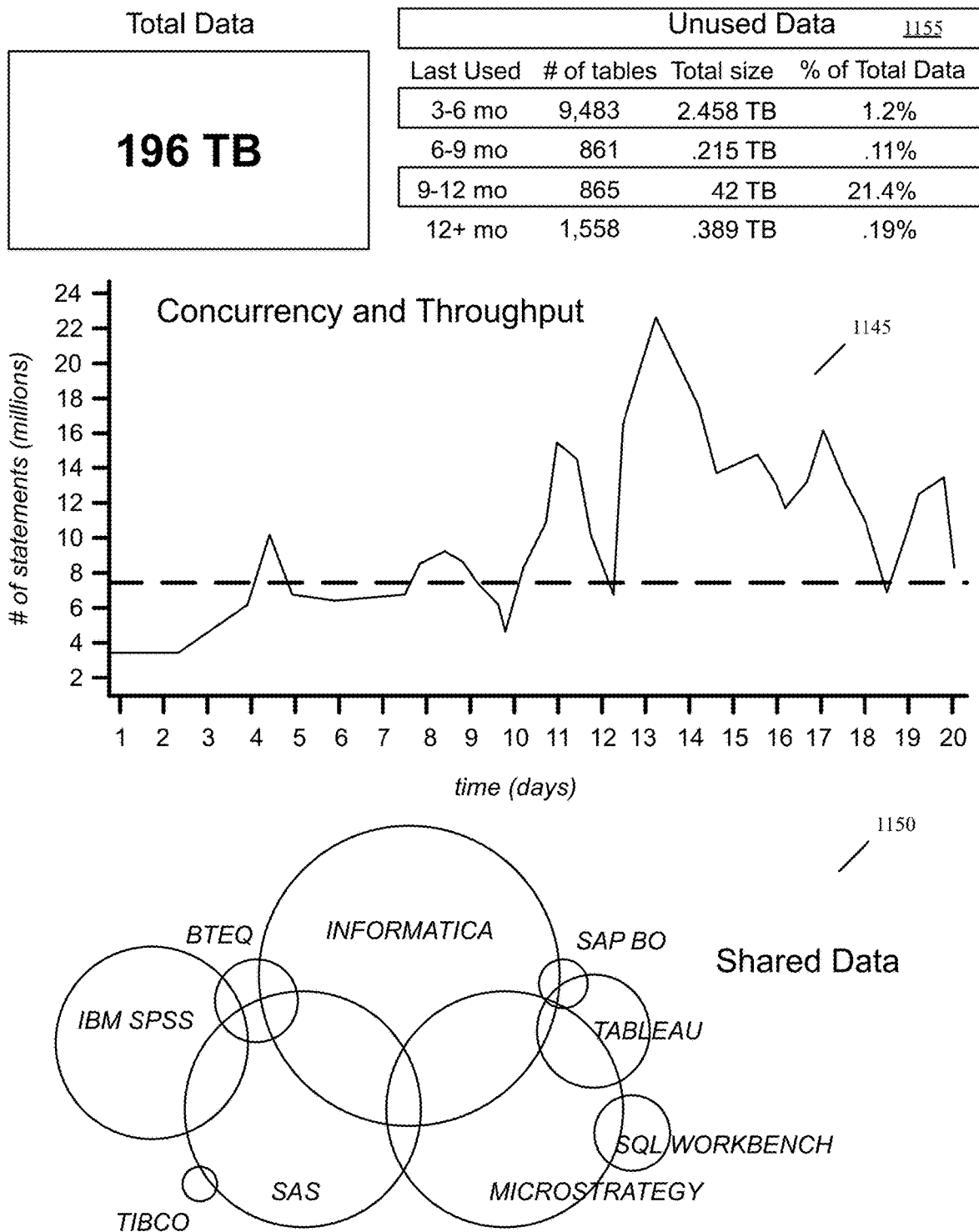

In some embodiments, the report also includes a breakdown by type of statement. FIG. 11C illustrates a report 1140 of the number of statements for each type (e.g. SELECT, INSERT, DELETE, etc.). As illustrated in FIG. 11D, the report also includes in some embodiments a breakdown 1145 of concurrency, throughput, and query volume by application, to identify potential bad actors or inefficient practices, e.g. using atomic inserts rather than bulk load operations. The report also includes in some such embodiments an assessment 1150 of load patterns, data shared between applications, and workload elasticity, for scaling up and down to save costs. Furthermore, the report also includes in some embodiments an assessment 1155 of data that is rarely used, and which can be migrated to a cheaper and slower database system, rather than a more expensive system with the necessary speed for more heavily used data. This assessment also provides recommendations for data archival and maintenance strategies in some embodiments.

Figure 11E:
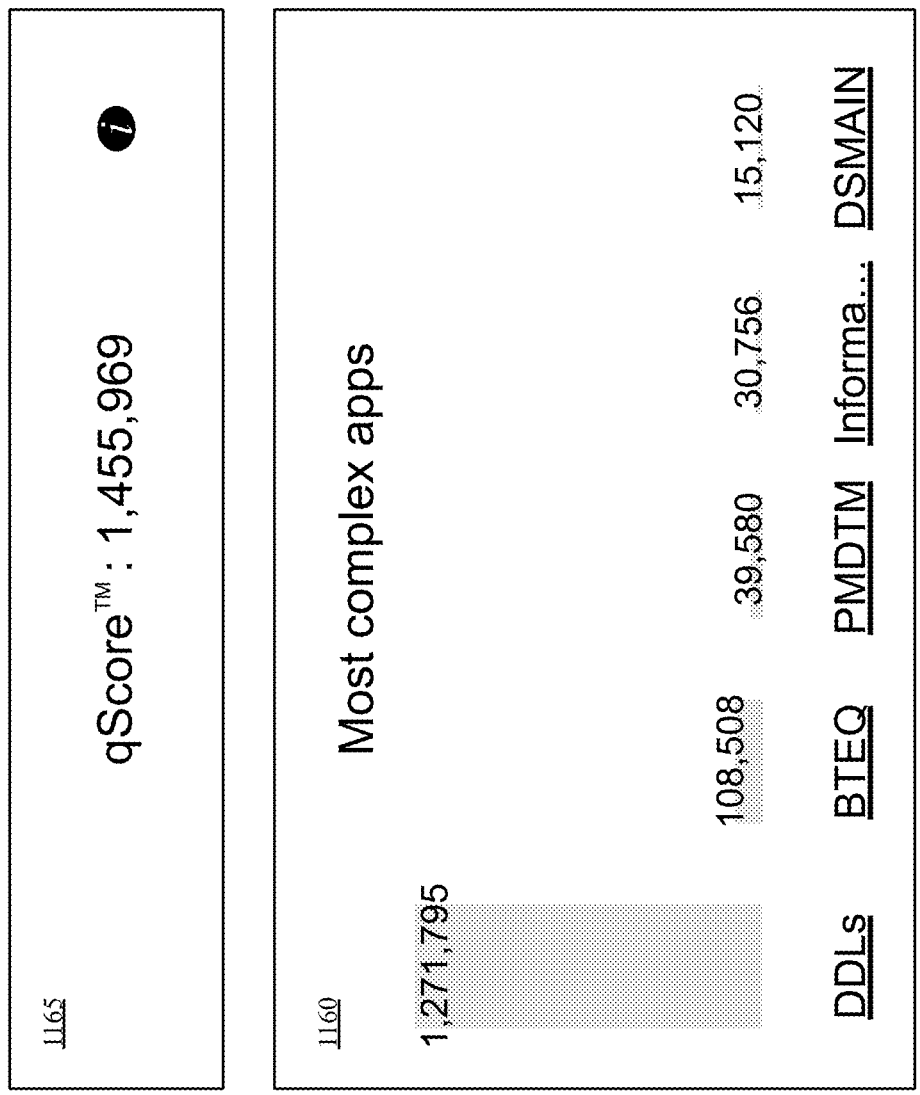
Figure 11F:
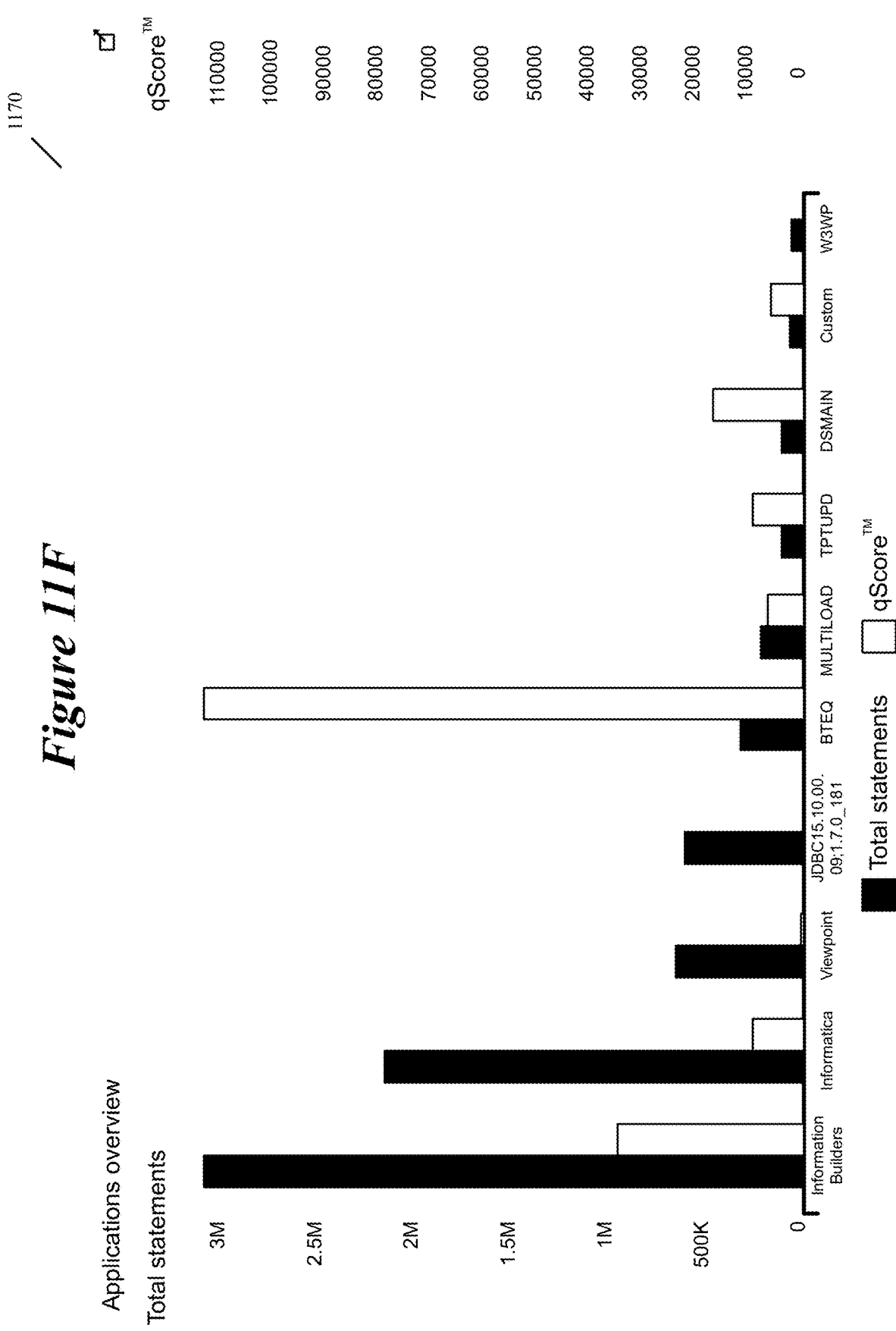

As conceptually illustrated in FIG. 11E, the report also includes in some embodiments the aggregated complexity scores for applications or clients 1160 and the workload as a whole 1165. In these embodiments, the report includes a ranking of applications based on complexity and/or migration feasibility. The report also includes in some such embodiments an assessment of which applications have the simplest workloads for migration and can be migrated more easily in a phased approach or identify applications that are complex but are not heavily used and can therefore be retired rather than migrated. As illustrated in FIG. 11F, the report includes in some embodiments a comparison 1170 of each application's complexity and its statement volume. Some apps may have low complexity and high statement volume, whereas others may have low statement volume and high complexity. As illustrated in FIG. 11G, in some embodiments, the report also includes a list 1175 of complex features. Complex features include samples, recursive calls, uppercase columns, merges, and date functions.

If a specific new database was specified, then in some embodiments the report also provides an assessment of how suitable it will be for the original database workload. For example, in some embodiments the assessment includes whether the new database system can handle the overall size, characteristics, and throughput of the database workload. The report also includes in some embodiments an assessment of whether the new database should be compute-heavy or storage-heavy. In other embodiments where the user does not specify a desired database system, the database insight engine provides a recommendation of a new database system based on a best match to the characteristics of the workload being analyzed.

Figure 11H:
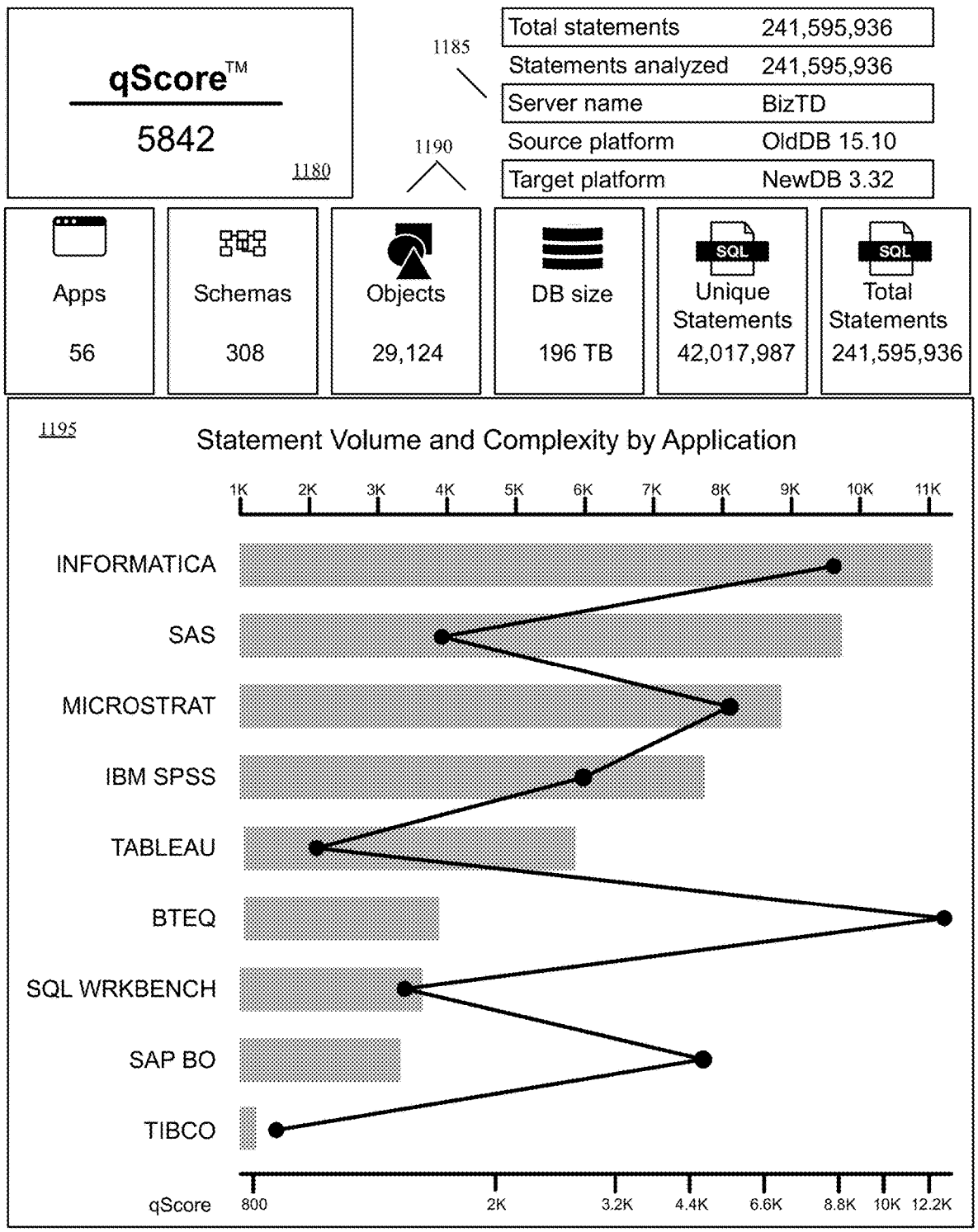

FIG. 11H illustrates a sample report that includes a number of the insights discussed above, presented in a unified interface. This interface combines the total complexity of the database workload (the "q-score") 1180, unused data 1185, physical statistics 1190, and statement volume and complexity by application 1195.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
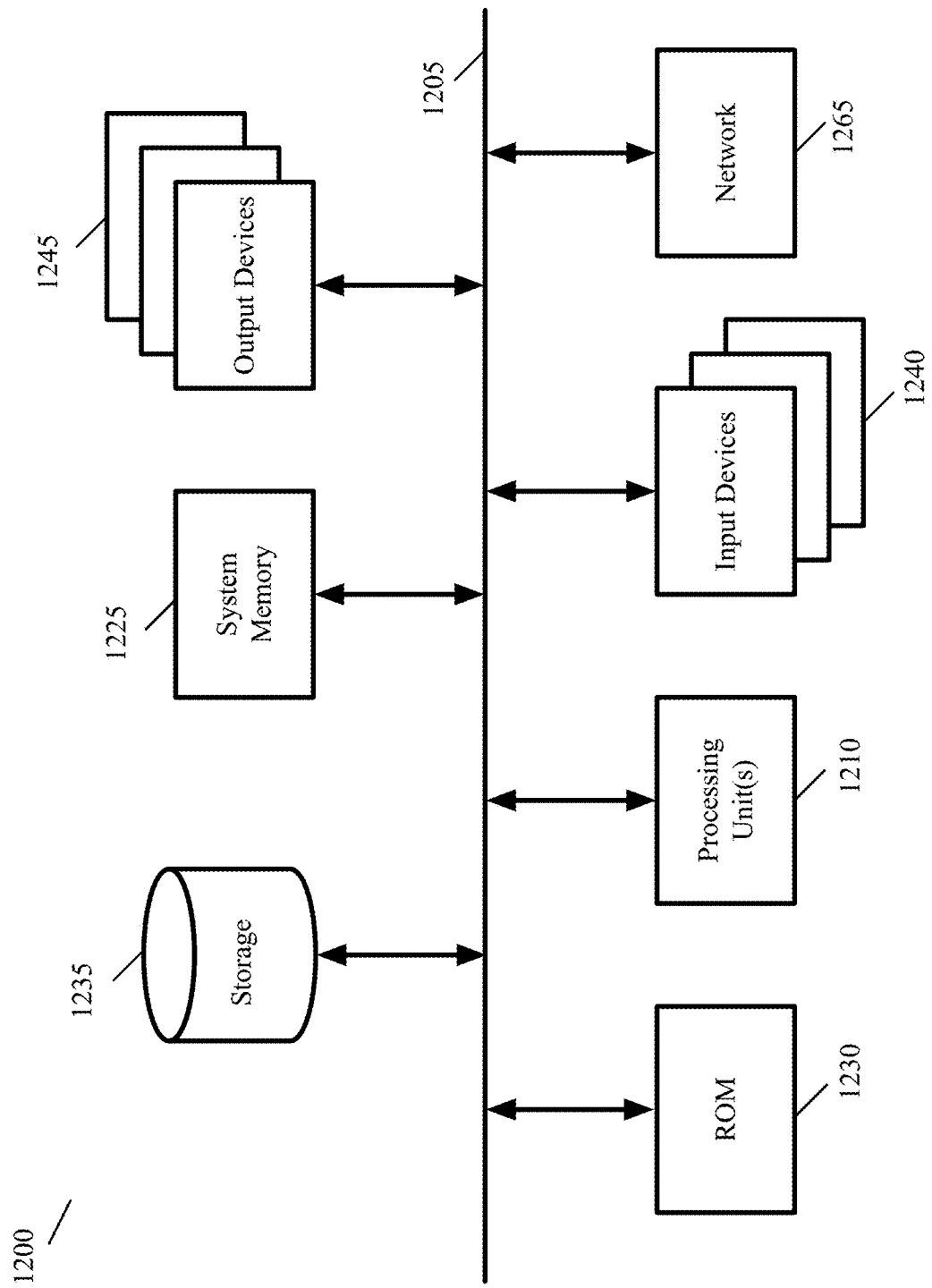
FIG. 12 conceptually illustrates an electronic system with which some embodiments of the invention are implemented.

FIG. 12 conceptually illustrates an electronic system 1200 with which some embodiments of the invention are implemented. The electronic system 1200 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the system memory 1225, and the permanent storage device 1235.

From these various memory units, the processing unit(s) 1210 retrieve instructions to execute and data to process in order to execute the processes of the invention. The processing unit(s) may be a single processor or a multi-core processor in different embodiments.

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device. Like the permanent storage device 1235, the system memory 1225 is a read-and-write memory device. However, unlike storage device 1235, the system memory is a volatile read-and-write memory, such as random-access memory. The system memory stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieve instructions to execute and data to process in order to execute the processes of some embodiments.

The bus 1205 also connects to the input and output devices 1240 and 1245. The input devices enable the user to communicate information and select commands to the electronic system. The input devices 1240 include alphanumeric keyboards and pointing devices (also called "cursor control devices"). The output devices 1245 display images generated by the electronic system. The output devices include printers and display devices, such as cathode ray tubes (CRT) or liquid crystal displays (LCD). Some embodiments include devices such as a touchscreen that function as both input and output devices.

Finally, bus 1205 also couples electronic system 1200 to a network 1265 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, at least one figure conceptually illustrates a process. The specific operations of this process are not performed in some embodiments in the exact order shown and described. The specific operations are not performed in one continuous series of operations, and different specific operations are performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method for quantifying complexity of database queries that reference database objects in a database, the method comprising:

identifying a database query comprising a reference to a set of one or more database objects in the database;

identifying a set of properties associated with a set of components of the identified query, wherein identifying the set of properties comprises (i) identifying the set of components of the identified query, (ii) grouping the components according to a set of component types, (iii) calculating a quantified number of each component type in the database query, and (iv) identifying a cost value for each component in the identified set of components of the identified query;

computing, from the identified set of properties, a complexity indicator that represents a complexity expression of the database query, wherein computing the complexity indicator comprises using the calculated quantified numbers for the different component types and the identified cost values for the identified set of components to compute the complexity indicator; and using the computed complexity indicator to assess a possible migration of data from the database to another database.

2. The method of claim 1, wherein identifying the database query comprises:
receiving the log of the database, said log comprising a set of queries performed on the database over a duration of time; and
identifying the query from the received log.

3. The method of claim 1, wherein using the calculated quantified numbers for the different component types to compute the complexity indicator comprises (i) assigning a weight value to each component type and (ii) performing a weighted sum of the quantified number of each type of component based on the assigned weighting values.

4. The method of claim 1, wherein computing the complexity indicator from the identified cost values comprises using a set of weight values to produce a blended aggregate complexity value from the identified cost values of the identified set of components.

5. The method of claim 1, wherein the identified set of components comprises:
the reference to the set of one or more objects in the database; and
at least one command that specifies an operation with respect to the set of referenced database objects, wherein the identified set of properties comprises a command type for the command and a set of attributes associated with the referenced database objects.

6. The method of claim 5, wherein the set of attributes comprises (i) a number of referenced database objects and (ii) an object type that specifies whether a particular referenced object is one of a persistent table, a temporary table, a view, a column, a macro, and a stored procedure.

7. The method of claim 5, wherein the command type is one of a SQL command type and a non-SQL command type, wherein the identified set of properties comprises a type for the operation specified by the command, the operation type comprising one of an inner join operation, an outer join operation, an implicit join operation and a partition operation.

8. The method of claim 5, wherein the identified set of properties comprises a type for a function used in the operation specified by the command, the function type comprising one of a data filtering function, a data format function, a data manipulation function, and a case sensitivity function.

9. The method of claim 1, wherein the database objects comprise at least one of a persistent table, a temporary table, a view, a column, a macro, and a stored procedure.

10. The method of claim 1, wherein the database is a first database, wherein the computed complexity indicator is a complexity score that represents the level of difficulty for (i) rewriting the query for a second database that is a candidate database for migrating the data in the first database, and (ii) verifying the results of executing the rewritten query on the second database.

11. A non-transitory machine readable medium storing a program which when executed by at least one processing unit, quantifies a complexity of database queries that reference database objects in a database, the program comprising sets of instructions for:
identifying a database query comprising a reference to a set of one or more database objects in the database;
identifying a set of properties associated with a set of components of the identified query, wherein identifying the set of properties comprises (i) identifying the set of components of the identified query, (ii) grouping the components according to a set of component types, (iii) calculating a quantified number of each component type in the database query, and (iv) identifying a cost value for each component in the identified set of components of the identified query; and
computing, from the identified set of properties, a complexity indicator that represents a complexity expression of the database query, wherein computing the complexity indicator comprises using the calculated quantified numbers for the different component types and the identified cost values for the identified set of components to compute the complexity indicator; and
using the computed complexity indicator to assess a possible migration of data from the database to another database.

12. The non-transitory machine readable medium of claim 11, wherein the set of instructions for identifying the database query comprises sets of instructions for:
receiving the log of the database, said log comprising a set of queries performed on the database over a duration of time; and
identifying the query from the received log.

13. The non-transitory machine readable medium of claim 11, wherein the set of instructions for using the calculated quantified numbers for the different component types to compute the complexity indicator comprises a set of instructions for (i) assigning a weight value to each component type and (ii) performing a weighted sum of the quantified number of each type of component based on the assigned weighting values.

14. The non-transitory machine readable medium of claim 11, wherein, the set of instructions for computing the complexity indicator from the identified cost values comprises a set of instructions for using a set of weight values to produce a blended aggregate complexity value from the identified cost values of the identified set of components.

15. The non-transitory machine readable medium of claim 11, wherein the identified set of components comprises:
the reference to the set of one or more objects in the database; and
at least one command that specifies an operation with respect to the set of referenced database objects, wherein the identified set of properties comprises a command type for the command and a set of attributes associated with the referenced database objects.

16. The non-transitory machine readable medium of claim 15, wherein the set of attributes comprises (i) a number of referenced database objects and (ii) an object type that specifies whether a particular referenced object is one of a persistent table, a temporary table, a view, a column, a macro, and a stored procedure.

17. The non-transitory machine readable medium of claim 11, wherein the database objects comprise at least one of a persistent table, a temporary table, a view, a column, a macro, and a stored procedure.

\* \* \* \* \*